(12) United States Patent
Leddy et al.

(10) Patent No.: US 10,081,873 B2
(45) Date of Patent: Sep. 25, 2018

(54) LANTHANIDE ELECTROCHEMISTRY

(71) Applicant: Johna Leddy, Iowa City, IA (US)

(72) Inventors: Johna Leddy, Iowa City, IA (US); Krysti L. Knoche, Salt Lake City, UT (US)

(73) Assignee: Johna Leddy, Iowa City, IA (US)

( * ) Notice: Subject to any disclaimer, the term of this patent is extended or adjusted under 35 U.S.C. 154(b) by 0 days.

(21) Appl. No.: 15/963,457

(22) Filed: Apr. 26, 2018

(65) Prior Publication Data

US 2018/0245225 A1   Aug. 30, 2018

Related U.S. Application Data

(63) Continuation of application No. 14/709,682, filed on May 12, 2015.
(Continued)

(51) Int. Cl.
*C25C 1/22*     (2006.01)
*C25B 1/00*     (2006.01)
(Continued)

(52) U.S. Cl.
CPC .............. *C25C 1/22* (2013.01); *B01J 19/087* (2013.01); *C25B 1/00* (2013.01); *C25B 9/08* (2013.01);
(Continued)

(58) Field of Classification Search
CPC ..................................................... C25D 1/22
(Continued)

(56) References Cited

U.S. PATENT DOCUMENTS 4,129,481 A   12/1978   Aubert et al.
5,609,745 A    3/1997   Adnet et al.
(Continued)

FOREIGN PATENT DOCUMENTS

WO   WO 2011/028264   3/2011
WO   WO 2012/114175   8/2012
WO   WO 2014/005598   1/2014

OTHER PUBLICATIONS

Antolini, E. et al., "The use of rare earth-based materials in low temperature fuel cells", Int'l Journal of Hydrogen Energy, vol. 36(2011) pp. 15752-15765; Retrieved from: http://www.sciencedirect.com/science/articie/pii/S0360319911020295.
(Continued)

*Primary Examiner* — Brian W Cohen
(74) *Attorney, Agent, or Firm* — The Marbury Law Group, PLLC

(57) ABSTRACT

Electrochemically reacting a lanthanide or actinide in solvent at a working electrode; wherein the solvent comprises an organic solvent such as acetonitrile which have a dielectric constant of at least three; wherein the solvent system further comprises an electrolyte; wherein the working electrode comprises an ionically conducting or permeable film such as a fluorosulfonate film; wherein at least one ligand such as triflate distinct from the ionically conducting or permeable film is present; wherein the ligand is chemically similar to a structure in the ionically conducting or ionically permeable film; and optionally wherein the electrochemical oxidation or reduction is carried out under the influence of a magnetic field which favorably enhances the reaction. Improved electrochemical methods, identification, and separation can be achieved. Also, an electrochemical device, wherein the device is adapted to employ the oxygen reduction reaction (ORR) at the cathode, wherein the cathode is
(Continued)

magnetically modified, or the electrolyte comprises at least one lanthanide or actinide, or both.

15 Claims, 10 Drawing Sheets

Related U.S. Application Data

(60) Provisional application No. 61/992,112, filed on May 12, 2014.

(51) Int. Cl.

| | | |
|---|---|---|
| *C25B 9/08* | (2006.01) | |
| *H01M 12/08* | (2006.01) | |
| *H01M 12/06* | (2006.01) | |
| *H01M 8/1016* | (2016.01) | |
| *C25C 7/02* | (2006.01) | |
| *B01J 19/08* | (2006.01) | |
| *C25D 3/54* | (2006.01) | |
| *H01M 8/1018* | (2016.01) | |
| *H01M 4/92* | (2006.01) | |

(52) U.S. Cl.
CPC .......... *C25C 7/02* (2013.01); *C25D 3/54* (2013.01); *H01M 8/1016* (2013.01); *H01M 12/06* (2013.01); *H01M 12/08* (2013.01); *H01M 4/92* (2013.01); *H01M 2008/1095* (2013.01); *Y02E 60/128* (2013.01)

(58) Field of Classification Search
USPC .................................................. 205/43–49
See application file for complete search history.

(56) References Cited

U.S. PATENT DOCUMENTS

| | | | |
|---|---|---|---|
| 5,871,625 A | 2/1999 | Leddy et al. | |
| 6,001,248 A | 12/1999 | Leddy et al. | |
| 6,171,522 B1 | 1/2001 | Michot et al. | |
| 6,207,313 B1 | 3/2001 | Leddy et al. | |
| 6,309,532 B1 * | 10/2001 | Tran .................... | B01J 47/08 204/267 |
| 7,354,531 B2 | 4/2008 | Boon et al. | |
| 8,846,256 B2 | 9/2014 | Tomita | |
| 2002/0004106 A1 | 1/2002 | Leddy et al. | |
| 2002/0012821 A1 | 1/2002 | Leddy et al. | |
| 2002/0026021 A1 | 2/2002 | Armand et al. | |
| 2003/0232223 A1 | 12/2003 | Leddy et al. | |
| 2004/0020785 A1 | 2/2004 | Minteer | |
| 2004/0026253 A1 | 2/2004 | Leddy et al. | |
| 2004/0108203 A1 | 6/2004 | Sullivan | |
| 2004/0137283 A1 | 7/2004 | Leddy et al. | |
| 2004/0197651 A1 | 10/2004 | Clarke et al. | |
| 2004/0234767 A1 | 11/2004 | Leddy et al. | |
| 2005/0084741 A1 | 4/2005 | Leddy et al. | |
| 2005/0213187 A1 | 9/2005 | Leddy et al. | |
| 2005/0214169 A1 | 9/2005 | Leddy et al. | |
| 2006/0130557 A1 | 6/2006 | Leddy et al. | |
| 2006/0180471 A1 | 8/2006 | O'Brien | |
| 2007/0009771 A1 | 1/2007 | Leddy et al. | |
| 2007/0048605 A1 | 3/2007 | Pez et al. | |
| 2007/0066849 A1 | 3/2007 | Leddy et al. | |
| 2007/0207360 A1 | 9/2007 | Tamura et al. | |
| 2008/0280179 A1 | 11/2008 | Sugiyama et al. | |
| 2008/0295573 A1 | 12/2008 | Leddy et al. | |
| 2010/0086823 A1 | 4/2010 | Koshino et al. | |
| 2010/0092779 A1 | 4/2010 | Leddy et al. | |
| 2010/0173068 A1 | 7/2010 | Leddy et al. | |
| 2010/0266907 A1 | 10/2010 | Yazami | |
| 2011/0171119 A1 | 7/2011 | Yazami | |
| 2012/0070763 A1 | 3/2012 | Monden et al. | |
| 2012/0193240 A1 * | 8/2012 | Clark ................... | C25C 1/22 205/158 |
| 2012/0270112 A1 | 10/2012 | Visco et al. | |
| 2012/0270138 A1 | 10/2012 | Koshino et al. | |
| 2013/0001094 A1 | 1/2013 | Cable et al. | |
| 2013/0020207 A1 | 1/2013 | Shao-Horn et al. | |
| 2013/0323541 A1 | 12/2013 | Mizuno et al. | |
| 2014/0066290 A1 | 3/2014 | Koshino et al. | |
| 2014/0072836 A1 | 3/2014 | Mills et al. | |
| 2014/0378016 A1 | 12/2014 | Leddy et al. | |

OTHER PUBLICATIONS

Bard, et al., *Electrochemical Methods, Fundamentals, and Applications*, 2$^{nd}$ Ed.; John Wiley, 2001.
Binnemans, "Lanthanides and Actinides in Ionic Liquids", *Chem. Rev.*, 2007, 107(6), 2592-2614.
Cotton, "Lanthanide and Actinide Chemistry", vol. 27 (2006) John Wiley & Sons; Uppingham School, Uppingham, Rutland, UK; Retrieved from: http://www.wiley.com/WileyCDA/WileyTitle/productCd-0470010053.html.
Evans, *Biochemistry of the Lanthanides*, pub. Springer Science+Business Media, LLC, Plenum Press, NY, v.8, 1990.
Lee, et al., "Enhanced alcohol electrocatalysis with the introduction of magnetic composites into nickel electrocatalysts", *Chem Commun* 2012, 48 (98), 11972-11974.
Markovic, N. M. et al., "Electrocatalysis at Well-Defined Surfaces: Kinetics of Oxygen Reduction and Hydrogen Oxidation/ Evolution on Pt(hkl) Electrodes", found in: Interfacial electrochemistry: theory, experiment and applications, Wieckowski ed., NY:Marcel Dekker, 1999, 821-842.
Martin, et al., "Hydrogen and Oxygen Evolution on Boron-Doped Diamond Electrodes", *J Electrochem Soc* 1996, 143 (6), L133-L136.
Parrish et al., "Electrochemical generation of low-valent lanthanides"; *Tetrahedron Letters*, 42 (2001), 7767-7770.
Savéant, J.-M. , "Molecular Catalysis of Electrochemical Reactions. Mechanistic Aspects", *Chemical Reviews*, 2008, 108(7), 2348-2378.
Schumacher et al., "Electroanalytical chemistry of lanthanides and actinides", *Rev. Anal. Chem.*, 2013, 32(2), 159-171.
Shroti et al., "Neodymium triflate modified nafion composite membrane for reduced alcohol permeability in direct alcohol fuel cell", Int'l Journal of Hydrogen Energy, vol. 36(2011) pp. 14907-14913; Retrieved from: http://www.sciencedirect.com/science/article/pii/S0360319911006197.
Song, C. et al., "Electrocatalytic Oxygen Reduction Reaction" In *PEM Fuel Cell Electrocatalysts and Catalyst Layers*; Zhang, J., Ed.; Springer London: London, 2008, pp. 89-134.
Suzuki, et al., "Electrochemistry, Stability, and Alkene Complexation chemistry of Copper(I) Triflate in Aqueous Solution. Potential for Use in Electrochemically Modulated Complexation-Based Separation Processes", *Inorganic Chemistry*, 1997, 36, 136-140.
Toyoshima et al., "Development of an electrochemistry apparatus for the heaviest elements", *Radlochem. Acta*, 96, 323-326 (2008).
Yamagata et al., "Electrochemical Behavior of Samarium, Europium, and Ytterbium in Hydrophobic Room-Temperature Molten Salt Systems", *J. Electrochem. Soc.*, 153(1), E5-E9 (2006).
Yuan et al., "Mercury-Free Detection of Europium (III) at a Glassy Carbon Electrode Modifies with Carbon Nanotubes by Adsorptive Stripping Voltammetry", *Anal. Letters*, 39, 373-385 (2006).
Invitation to pay additional fees with partial search report received in connection with international application No. PCT/US2015/030286; dated Aug. 17, 2015.

* cited by examiner

LANTHANIDE ELECTROCHEMISTRY

RELATED APPLICATIONS

This application is a continuation of U.S. application Ser. No. 14/709,682, filed May 12, 2015, which claims benefit of priority to U.S. provisional application Ser. No. 61/992,112 filed May 12, 2014, which applications are hereby incorporated by reference in their entireties.

FEDERAL FUNDING STATEMENT

This invention was made with government support under grants 0809745 and 1309366 awarded by the National Science Foundation. The government has certain rights in this invention.

BACKGROUND

Electrochemistry is a powerful tool for many different types of commercial processes including, for example, separations, sensing, identification, forming elemental metals, energy generation and storage, catalysis, and the like. However, the electrochemistry of rare earth elements, the lanthanides and the actinides, is generally a more difficult topic in view of unique properties of lanthanides and actinides. Electrochemically, lanthanide analysis is limited by their standard potentials (in the range of −1.99 and −3.90 V v. NHE; Cotton, S., *Lanthanide and Actinide Chemistry*, Wiley: 2007; Vol. 27). These potentials fall outside of the potential window of common liquid electrochemical solvents (e.g., aqueous and organic). For example, in aqueous solutions at platinum, the potential window (in 1 M acid) is limited between +1.3 and −0.7 V vs NHE by solvent electrolysis (Bard, A. J.; Faulkner, L. R., *Electrochemical Methods, Fundamentals, and Applications*, $2^{nd}$ Ed.; John Wiley, 2001). Previously, researchers have resorted to mercury drop electrodes or chemically modified carbon paste electrodes to look at lanthanide compounds (Schumacher et al., *Rev. Anal. Chem.*, 2013, 32(2), 159-171). In many cases, moreover, electrochemistry is undertaken in less tractable and more costly solvent systems of molten salts and ionic liquids (Binnemans, *Chem. Rev.*, 2007, 107(6), 2592-2614; Yamagata et al., *J. Electrochem. Soc.*, 153(1), E5-E9 (2006). Also, because most properties of lanthanides and actinides (e.g., masses, ionic radii, oxidation states, and standard potentials) vary little across the row, actinide and especially lanthanide separations are difficult as they rely on numerous sequential extractions.

As a result, present lanthanide and actinide detection and separation methods are tedious, costly, and time-consuming. Despite these difficulties, lanthanides and actinides are commercially important, critical materials, so commercial need drives the development for new approaches for rare earth electrochemistry and separations. For example, lanthanide isotopes are produced during fission of $^{235}U$, most of which decays to a stable, nonradioactive mixture that includes lanthanide elements.

Clearly, a commercial need exists for better electrochemical methods for lanthanides and actinides including, for example, separations, detections and identifications, and also in technologically important reactions like the oxygen reduction reaction (ORR), critical in batteries and fuel cells, for example.

Some attempts to develop electrochemical methodologies for lanthanides and actinides in simple aprotic electrochemical solvents have been made with negative or limited results. Parrish et al., *Tetrahedron Letters*, 42 (2001), 7767-7770 describes an experiment in which Sm or Yb triflate compounds are reported reduced in acetonitrile at an unmodified electrode. However, in reproducing these experiments, it was found that the waves identified as lanthanide triflates disappeared on sparging with nitrogen. The reported results could not be reproduced, and there is no description of modifying the electrode.

For aqueous solvent, Yuan et al., *Anal. Letters*, 39, 373-385 (2006) teaches about detection of Europium(III) with use of differential pulse stripping voltammetry in water with Nafion modified electrodes further modified with multi-wall carbon nanotubes for more sensitive detection. Toyoshima et al., *Radiochem. Acta*, 96, 323-326 (2008) describes a flow electrolytic cell in water.

SUMMARY

Embodiments described herein include methods of electrochemistry and related compositions, systems, devices, and apparatuses which enable use of these methods.

One aspect provides for a method comprising: electrochemically oxidizing and/or reducing at least one lanthanide, at least one actinide, or a combination thereof, irrespective of oxidation state, in a solvent system at at least one working electrode, wherein the solvent system comprises one or more organic solvents which have a dielectric constant of at least three and the water of the solvent system is less than about 25 wt. %; wherein the solvent system further comprises at least one electrolyte; wherein the at least one working electrode comprises at least one electronically conductive electrode substrate and at least one ionically conducting or ionically permeable film disposed on the substrate; wherein at least one ligand distinct from the ionically conducting or ionically permeable film is present as part of the lanthanide, the actinide, the electrolyte, or a combination thereof, wherein the ligand facilitates the oxidizing and/or reducing of the lanthanide, actinide, or combination thereof; and wherein the ligand is chemically similar to a structure in the ionically conducting or ionically permeable film.

Another aspect provides for a method comprising: electrochemically oxidizing and/or reducing at least one lanthanide, at least one actinide, or a combination thereof, irrespective of oxidation state, in a solvent system at at least one working electrode, wherein the solvent system comprises one or more organic solvents which have a dielectric constant of at least three and the water of the solvent system is less than about 25 wt. %; wherein the solvent system further comprises at least one electrolyte; wherein the at least one working electrode comprises at least one electronically conductive electrode substrate and at least one fluorosulfonate film disposed on the substrate; wherein at least one fluorosulfonate ligand distinct from the fluorosulfonate film is present as part of the lanthanide, the actinide, the electrolyte, or a combination thereof, wherein the ligand facilitates the oxidizing and/or reducing of the lanthanide, actinide, or combination thereof.

In one embodiment, the electrochemical oxidation and/or reduction is carried out under the influence of a magnetic field which favorably enhances the reaction. In another embodiment, the electrochemical oxidation and/or reduction is not carried out under the influence of a magnetic field which favorably enhances the reaction.

In one embodiment, the step of electrochemically oxidizing and/or reducing is carried out on a lanthanide but not an actinide. In another embodiment, the step of electrochemically oxidizing and/or reducing is carried out on a mixture of lanthanide and actinide. In another embodiment, the step of electrochemically oxidizing and/or reducing is carried out on a mixture of at least two different lanthanides.

In one embodiment, the lanthanide, irrespective of oxidation state, is Ln, Pr, Nd, Pm, Sm, Gd, Tb, Dy, Ho, Er, Tm, Yb, or Lu. In another embodiment, the lanthanide, irrespective of oxidation state, is Pr, Sm, Gd, Dy, or Yb.

In one embodiment, the solvent has a dielectric constant of at least 5. In another embodiment, the solvent is acetonitrile.

In one embodiment, the ligand is a fluorosulfonate anion. In another embodiment, the ligand is trifluoromethane sulfonate (triflate).

In one embodiment, the film comprises at least one polymer. In another embodiment, the film comprises at least one ionically conductive polymer. In another embodiment, the film comprises at least one fluorosulfonate polymer. In another embodiment, the film comprises at least one fluorosulfonate polymer, and the ligand is a fluorosulfonate anion.

In one embodiment, the film is not magnetically modified. In another embodiment, the working electrode is magnetically modified. In another embodiment, the film is magnetically modified. In another embodiment, the film is magnetically modified with use of magnetic particles.

Another aspect provides for a method comprising: electrochemically oxidizing and/or reducing at least one lanthanide, at least one actinide, or a combination thereof, irrespective of oxidation state, in a solvent system at at least one working electrode, wherein the solvent system comprises one or more organic solvents which have a dielectric constant of at least three and the water of the solvent system is less than about 25 wt. %; wherein the solvent system further comprises at least one electrolyte; wherein the at least one working electrode comprises at least one electronically conductive electrode substrate and at least one ionically conducting or ionically permeable film disposed on the substrate; wherein at least one ligand distinct from the ionically conducting or ionically permeable film is present as part of the lanthanide, the actinide, the electrolyte, or a combination thereof, wherein the ligand facilitates the oxidizing and/or reducing of the lanthanide, actinide, or combination thereof; wherein the ligand is chemically similar to a structure in the ionically conducting or ionically permeable film; wherein the electrochemical oxidation and/or reduction is carried out under the influence of a magnetic field which favorably enhances the reaction.

In one embodiment, the step of electrochemically oxidizing and/or reducing is carried out on a lanthanide but not an actinide. In another embodiment, the step of electrochemically oxidizing and/or reducing is carried out on a mixture of lanthanide and actinide. In another embodiment, the step of electrochemically oxidizing and/or reducing is carried out on a mixture of at least two different lanthanides.

In one embodiment, the working electrode is magnetically modified.

In one embodiment, the film is magnetically modified.

In one embodiment, the ligand is a fluorosulfonate anion. In another embodiment, the ligand is trifluoromethane sulfonate (triflate).

In one embodiment, the film comprises at least one fluorosulfonate polymer. In one embodiment, the film comprises at least one fluorosulfonate polymer, and the ligand is a fluorosulfonate anion.

Another aspect provides for an electrochemical device, wherein the device comprises at least one cathode, and at least one anode, and at least one electrolyte between the cathode and the anode, wherein the device in operation is adapted to employ the oxygen reduction reaction (ORR) at the cathode, and wherein the cathode is magnetically modified, or the electrolyte comprises at least one lanthanide and/or actinide compound, or both, wherein the ORR reaction is enhanced by the cathode modification or by the electrolyte comprising at least one lanthanide and/or actinide compound.

In one embodiment, the cathode is magnetically modified, but the electrolyte does not comprise at least one lanthanide and/or actinide compound. In another embodiment, the cathode is not magnetically modified, but the electrolyte does comprise at least one lanthanide and/or actinide compound. In another embodiment, the cathode is magnetically modified, and the electrolyte does comprise at least one lanthanide and/or actinide compound. In another embodiment, the cathode is magnetically modified, and the electrolyte comprises at least one lanthanide compound, or both. In another embodiment, the cathode is not magnetically modified, but the electrolyte does comprise at least one lanthanide compound. In another embodiment, the cathode is magnetically modified with use of a ionically conducting or ionically permeable film comprising a magnetic material. In another embodiment, the cathode is magnetically modified with use of a film comprising magnetic particles. In another embodiment, the cathode is magnetically modified with use of a film comprising magnetic particles and a fluorosulfonic acid polymer. In another embodiment, the at least one lanthanide and/or actinide compound comprises trifluoromethanesulfonate.

In one embodiment, the device is a battery or fuel cell. In one embodiment, the device is a metal air battery.

Other embodiments include devices and apparatuses to carry out or be used in the methods described and claimed herein.

At least one advantage for at least some embodiments includes enabling facile electrochemical processes on lanthanides and/or actinides.

At least one additional advantage for at least some embodiments includes ability to do electrochemistry on the "benchtop" in common liquid organic solvents at ambient temperature (in contrast to more difficult and costly systems such as molten salts or ionic liquids in which it is difficult to maintain the minimal water content needed for effective lanthanide and actinide electrolysis).

At least one additional advantage for at least some embodiments is improved ability to separate lanthanides and actinides. This can arise from, for example, increased separation in peak potentials. In some cases, one can also simultaneously identify and separate components.

At least one additional advantage for at least some embodiments is improved oxygen reduction reactions (ORRs) in devices which are based on or limited by ORR such as metal air batteries and low temperature fuel cells.

At least one additional advantage for at least some embodiments is for oxygen generation and oxygen enrichment systems.

BRIEF DESCRIPTION OF THE DRAWINGS

FIG. 1. 20 mV/s cyclic voltammogram of first and second sweep for NAFION modified platinum electrode in ytterbium triflate. Inset is a 200 mV/s cyclic voltammogram of the first reductive wave.

FIG. 2. Demonstration of how lanthanide cyclic voltammograms are analyzed with a 20 mV/s cyclic voltammogram of first and second sweep for NAFION modified platinum electrode in ytterbium triflate.

FIG. 3. Overlay of 200 mV/s cyclic voltammograms of NAFION modified platinum electrodes in 1.00 mM copper triflate and 1.00 mM ytterbium triflate solutions. Electrolyte is 0.10 M $TBABF_4$ for both.

FIG. 4. Overlay of 200 mV/s cyclic voltammograms at a NAFION modified platinum electrode for a 0.10 M $TBABF_4$ only solution saturated with $O_2$ (g) (short dashed line) and sparged with $N_2$ (g) (solid line). Inset is a 200 mV/s cyclic voltammogram for a 1.00 mM ytterbium triflate and 0.10 M $TBABF_4$ solution saturated with 02 (g).

FIG. 5. 20 mV/s cyclic voltammograms of full potential window first sweeps for NAFION modified platinum electrodes in praseodymium triflate, gadolinium triflate, dysprosium triflate, samarium triflate, and ytterbium triflate. Electrolyte is $TBABF_4$ in acetonitrile for all. Voltammograms are plotted at a vertical offset for clarity, so a 100 µA current scale is shown at left.

FIG. 6. 200 mV/s cyclic voltammograms of peak A only for NAFION modified platinum electrodes in praseodymium triflate, gadolinium triflate, dysprosium triflate, samarium triflate, and ytterbium triflate. Electrolyte is $TBABF_4$ in acetonitrile for all. Voltammograms are plotted at a vertical offset for clarity, so a 400 µA current scale is shown at left.

FIG. 7. 20 mV/s cyclic voltammograms of full potential window first sweeps for NAFION film (solid lines) and NAFION+SiMag-C1 composite (dashed lines) modified platinum electrodes in praseodymium triflate, gadolinium triflate, dysprosium triflate, samarium triflate, and ytterbium triflate. Electrolyte is $TBABF_4$ in acetonitrile for all. Voltammograms are plotted at a vertical offset for clarity, so a 100 µA current scale is shown at left.

FIG. 8. Overlay of 200 mV/s cyclic voltammograms for a nitrogen sparged solution of 0.10 M $TBABF_4$ at a platinum electrode modified with a NAFION only film (N $N_2$, solid line) and oxygen saturated solutions of 0.10 M $TBABF_4$ in acetonitrile at platinum electrodes modified with a NAFION film (N O2, long dashed line) and a magnetized NAFION+SiMag-C1 composite (C1 $O_2$, short dashed line).

FIG. 9. Overlay of 200 mV/s cyclic voltammograms for oxygen saturated solutions of 0.10 M $TBABF_4$ in acetonitrile at platinum electrodes modified with composites of NAFION+SiMag-C1 (C1, short dashed line), NAFION+SiMag-C3 (C3, long dashed line), and NAFION+SiMag-C8 (C8, solid line).

FIG. 10. a) Overlay of 200 mV/s cyclic voltammograms for oxygen saturated solutions of 1.00 mM ytterbium triflate+0.10 M $TBABF_4$ in acetonitrile (N YbOTF+$O_2$, long dashed line) and 0.10 M $TBABF_4$ in acetonitrile (N $O_2$, solid line) at platinum electrodes modified with a NAFION film. b) Overlay of 200 mV/s cyclic voltammograms for oxygen saturated solutions of 1.00 mM ytterbium triflate+0.10 M $TBABF_4$ at electrodes modified with a NAFION film (N YbOTF+02, long dashed line) and a magnetized NAFION+SiMag-C1 composite (C1 YbOTF+02, short dashed line).

DETAILED DESCRIPTION

Introduction

Figure 1:
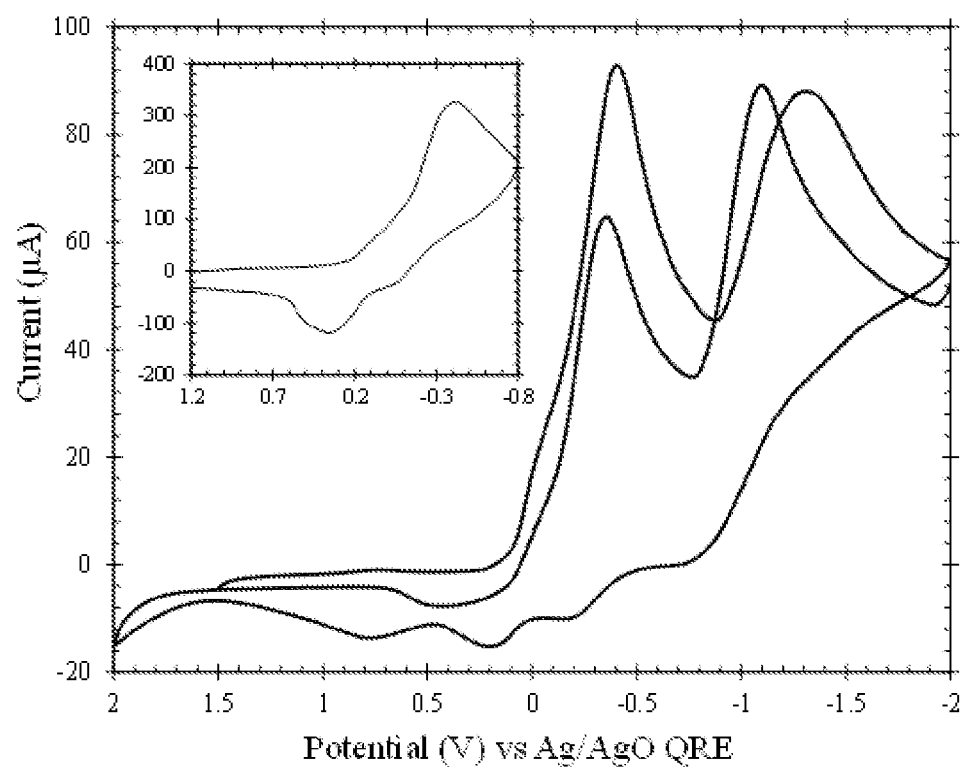
FIGS. 1-10 show non-limiting illustrative embodiments and examples.

The following PhD thesis is hereby incorporated by reference in its entirety, with particular focus on Chapters 4, 5, and 6: Krysti L. Knoche, ©2015, "Density Gradient Films, Lanthanide Electrochemistry, and Magnetic Field Effects on Hydrogen Evolution, Oxygen Reduction, and Lanthanide Electrochemistry." This incorporation by reference includes the working examples, figures, literature citations, materials and methods, and results and discussion.

An inventive aspect is a method comprising: A method comprising: electrochemically oxidizing and/or reducing at least one lanthanide, at least one actinide, or a combination thereof, irrespective of oxidation state, in a solvent system at at least one working electrode, wherein the solvent system comprises one or more organic solvents which have a dielectric constant of at least three and the water of the solvent system is less than about 25 wt. %; wherein the solvent system further comprises at least one electrolyte; wherein the at least one working electrode comprises at least one electronically conductive electrode substrate and at least one ionically conducting or ionically permeable film disposed on the substrate; wherein at least one ligand distinct from the ionically conducting or ionically permeable film is present as part of the lanthanide, the actinide, the electrolyte, or a combination thereof, wherein the ligand facilitates the oxidizing and/or reducing of the lanthanide, actinide, or combination thereof; and wherein the ligand is chemically similar to a structure in the ionically conducting or ionically permeable film.

While not being limited by theory, it is believed likely that formal potentials for electrochemical oxidation or reduction are shifted into the voltage window of the solvent (e.g., acetonitrile) due to complexation with the fluorosulfonate (e.g. triflate). Furthermore, the fluorosulfonate film can further solubilize the compound. The various embodiments and aspects are described more below.

Electrochemically Oxidizing and/or Reducing

Electrochemical oxidation and/or reductions are well-known in the art and can be evaluated by cyclic voltammetry methods and with electrochemical instrumentation.

In one embodiment, the electrochemical oxidation and/or reduction is carried out under the influence of a magnetic field which favorably enhances the reaction (see Part II of the Working Examples). In another embodiment, the electrochemical oxidation and/or reduction is not carried out under the influence of a magnetic field which favorably enhances the reaction (see Part I of the Working Examples).

Lanthanides and/or Actinides

Herein, lanthanides and/or actinides are subjected to electrochemical oxidation and/or reduction. For use herein, a lanthanide (or a lanthanide compound or complex) or an actinide (or an actinide compound or complex) broadly includes various compounds, forms, elements, metals, alloys, ingots, mixtures, complexes, and salts of the lanthanide or actinide metal, irrespective of the oxidation state. For example, $Ln(OTf)_3$ is a lanthanide or a lanthanide compound. For lanthanide and actinide descriptions, see, for example, Cotton and Wilkinson, *Advanced Inorganic Chemistry, A Comprehensive Text*, 4$^{th}$ Ed., Chapters 23-24. The lanthanide and/or actinide can exist as a complex or compound having one or more ligands, or anions, associated with it. Anions can have one or more negative charges. Ligands can have one, two, or more coordinating atoms such as oxygen or nitrogen. Chelating anions and ligands can be used. Cations can also be present on the ligand.

The lanthanide metals which can be used are La, Ce, Pr, Nd, Pm, Sm, Eu, Gd, Tb, Dy, Ho, Er, Tm, Yb, and Lu. In one embodiment, the group of lanthanide metals is selected from La, Pr, Nd, Pm, Sm, Gd, Tb, Dy, Ho, Er, Tm, Yb, and Lu. In one embodiment, the group of lanthanide metals is selected from Yb, Sm, Dy, Gd, and Pr. Mixtures of different lanthanide compounds and lanthanide metals can be used. In one embodiment, the lanthanide is not cerium, and/or is not europium.

The actinide metals are Ac, Th, Pa, U, Np, Pu, Am, Cm, Bk, Cf, Es, Fm, Md, No, and Lr. Mixtures of different actinides can be used. Mixtures of lanthanide and actinide compounds can be used.

The oxidation state of the metal in the metal compound subjected to the methods herein is not particularly limited but can be, for example, 3+, 2+, 4+, 1+, or 0.

Hence, in one preferred embodiment, the step of electrochemically oxidizing and/or reducing is carried out on a lanthanide but not an actinide.

In another preferred embodiment, the step of electrochemically oxidizing and/or reducing is carried out on a mixture of lanthanide and actinide. The purpose can be one of separation, for example.

In another preferred embodiment, the step of electrochemically oxidizing and/or reducing is carried out on a mixture of at least two different lanthanides. Again, the purpose can be one of separation, for example.

In more preferred embodiments, the lanthanide, irrespective of oxidation state, can be Pr, Nd, Pm, Sm, Gd, Tb, Dy, Ho, Er, Tm, Yb, or Lu. Alternatively, the lanthanide, irrespective of oxidation state, can be Pr, Sm, Gd, Dy, or Yb.

In some embodiments, yttrium and/or scandium can also be present in the oxidation and/or reduction step. Other elements, metals, and compounds can be also present depending on the need. For example, crude materials may be subjected to the electrochemical reaction which has many components besides the lanthanide and/or actinide.

Electrode Comprising Ionically Conducting or Ionically Permeable Film

Electrodes which are relatively easy to make and use can be used herein. In contrast, difficult electrodes such as mercury electrodes can be avoided. The electrode can comprise an electronically conductive substrate which has a surface film or coating comprising an ionically conductive or ionically permeable material. The film and/or the material can comprise at least one polymer including at least one ionically conductive polymer. The polymer can be, for example, a polyelectrolyte including an anionic polymer bearing negative charge or a cationic polymer bearing positive charge. Uncrosslinked or crosslinked forms of polymers can be used.

The electrode substrate is not particularly limited but can be, for example, platinum, glassy carbon, gold, or boron doped diamond (BDD). Such electrodes, which are electronically conductive, are well known in the electrochemical arts.

In one embodiment, the film comprises at least one polymer, which can be, for example, an ionically conductive polymer, which can be, for example, a fluorosulfonate polymer. Examples include polymers which are polyethers; polymers having amine including quaternary amine functional groups; polymers which are fluorinated, perfluorinated, and not fluorinated sulfonates; polymers which are fluorinated, perfluorinated, and not fluorinated carbonates; conjugated polymers; and mixtures of polymers.

At least one polymer film can be disposed on the substrate comprising at least one ionically conductive polymer such as a fluorosulfonate polymer. In an anionic polymer such as a fluorosulfonic acid polymer, the proton or cation can be associated with the anion and the cation can be varied.

The film thickness is not particularly limited but can be, for example, 500 nm to 50 microns, or one micron to 10 microns. The polymer can be supported as needed. Fluorosulfonate polymers are known in the art. NAFION® is a polymeric form of a sulfonated tetrafluoroethylene based fluorocarbon and can be used in the surface coating of polymeric material. Similar fluorosulfonate polymers can be used. The density of sulfonate groups and the molecular and equivalent weights can be adapted to the need. Methods known in the art for film formation can be used.

In one embodiment, the film further comprises at least one conductive filler such as, for example, carbon black, or various nanowire or nanotube structures. In another embodiment, the film further comprises at least one conductive filler which is a nanotube or nanowire. In another embodiment, the film contains no conductive filler. Particles can be added to the film. Film swelling can be controlled.

In one embodiment, the film is not magnetically modified.

In another embodiment, the working electrode is magnetically modified as described hereinbelow, optionally by adapting the film. For example, the film can be magnetically modified including magnetically modified with use of magnetic particles in the film.

In another embodiment, an external magnetic field can be applied to the electrode.

Ligand

At least one ligand which is distinct from the ionically conducting or ionically permeable material or film is present as part of the lanthanide, the actinide, the electrolyte, or a combination thereof. The ligand facilitates the oxidizing and/or reducing of the lanthanide, actinide, or combination thereof. It may enhance solubility, for example. In one embodiment, for the source of the ligand, the ligand is part of the lanthanide and/or actinide. In another embodiment, for the source of the ligand, it is part of the electrolyte. In another embodiment, for the source of the ligand, the ligand is part of the lanthanide and/or actinide, and also it is part of the electrolyte. Once the lanthanide and/or actinide is mixed with the solvent system, and electrolyte, it may not be possible to tell where the source of the ligand was as exchange reactions can take place.

The ligand is not particularly limited but can be an anion, a neutral moiety, or even a cation or a moiety which comprises a cation. It can be an ion or a molecule. An anion or neutral form of the ligand is preferred. An anion is particularly preferred. The ligand can even be zwitterionic in form, having both a cation and an anion. The ligand can be one that is known to complex or be associated with a lanthanide and/or actinide including a chelating ligand or a ligand with multiple charges.

Examples of ligands include crown ethers, sulfonate or carbonate anions, EDTA, or conjugated molecules such as cyclooctatetrene, cyclopentadiene, or pentamethylcyclopentadiene.

In one embodiment, the ligand is a fluorosulfonate anion. In another embodiment, the ligand is a chelating anionic ligand. Examples of chelating ligands include, for example, thymolphthalexon, 2-thenoyltrifluoroacetone (TTA), triethylenetetraaminehexaacetic acid (TTHA), ethylenediaminetetraacetic acid (EDTA), and diethylenetriaminepentaacetic acid (DTPA). Fluorosulfonate anions are known in the art. For example, an aromatic ring can be functionalized with sulfonate and also fluorinated. An example is a fluorinated benzene sulfonate compound or a trifluoromethane sulfonate, i.e. "triflate." See for example Suzuki, Noble, and Koval, *Inorganic Chemistry*, 1997, 36, 136-140 for a complexation, solubility, and ligand exchange study of copper triflate.

In one embodiment, the fluorosulfonate anion is part of the lanthanide compound. In a preferred embodiment, the fluorosulfonate anion is trifluoromethane sulfonate (triflate).

Chemically Similar

It is generally desired that the ligand, whether it be an anion or not, is chemically similar to a structure in the ionically conductive or ionically permeable film. The chemical similarity can be structural and/or functional. The ligand and the structure in the film, for example, might have similar interaction with the lanthanide and/or actinide. In one example of this chemical similarity, the ligand is a fluorosulfonate anion (e.g., triflate), and the ionically permeable or ionically conductive polymer is a fluorosulfonate polymer (e.g., NAFION). Other examples include situations such as a polyether and a crown ether; or a sulfonate polymer with a sulfonate anion; or a carbonate polymer with a carbonate anion; or a conjugated polymer with a conjugated anion or ligand. If the ligand is EDTA, the polymer can include acetate and/or tertiary amine functionality.

Solvents and Solvent System

Organic and/or nonaqueous solvents and solvent systems are generally known in the art. See, for example, K. Izutsu, *Electrochemistry in Nonaqueous Solutions*, $2^{ND}$ Ed., 2009. See, in particular, pages 3-25.

The solvent system can be based on at least one solvent having a dielectric constant of at least about 3, or at least about 5, or at least about 8, or at least about 10, or at least about 20, or at least about 30.

Numerous organic solvents can be used within this teaching. For example, the dielectric constant for acetonitrile is 36.64; for methylene chloride 9.08; for DMSO 47; for propylene carbonate 65; for dimethyl formamide (DMF) 36.7; for ethylene carbonate 89.8 at 40° C. In contrast, for example, the dielectric constants for some hydrocarbon solvents are 2.28 for benzene, 1.92 for heptane, 1.89 for hexane, 2.38 for toluene.

Dielectric constants for common solvents provided in, for example, CRC ($87^{th}$ Ed.) or Vogel's *Practical Organic Chemistry* ($5^{th}$ Ed.); or K. Izutsu, *Electrochemistry in Non-aqueous Solutions*, $2^{ND}$ Ed., 2009.

In many cases, a primary solvent will be present which is at least about 80 wt. %, or at least 95 wt. %, or at least 98 wt. % of the solvent system. Mixtures of solvents can be used.

In general, water is preferably excluded and not added, although minor portions of water might be present if desired in the context and the economic cost of water removal. For example, the water of the solvent system can be less than about 25 wt. %; or less than about 15 wt. %; or less than about 5 wt. %; less than about 1 wt. %.

In one preferred embodiment, the solvent has a dielectric constant of at least 20. In another preferred embodiment, the solvent is acetonitrile.

In one preferred embodiment, the fluorosulfonate anion is trifluoromethane sulfonate (triflate) and the solvent is acetonitrile.

Acetonitrile provides a larger voltage window (roughly+ 1800 mV versus Ag|Ag oxide quasireference electrode (QRE) than water. With more stringent exclusion of water, voltage windows of greater than 4 V are accessible. Acetonitrile has excellent properties as an electrochemical solvent because acetonitrile has a dielectric constant, viscosity, and density similar to water.

Using the solvent systems described herein, ionic liquids and molten salts can be avoided in the electrochemical oxidation and/or reduction steps.

Electrochemical Conditions

Electrochemical methods known in the art can be used including cyclic voltammetry (CV). See, for example, Bard, Faulkner, *Electrochemical Methods, Fundamentals, and Applications*, $2^{nd}$ Ed., 2001.

The atmosphere can be an inert gas such as nitrogen or can be saturated with oxygen, or any oxygen concentration between that includes equilibrium with atmospheric oxygen.

The temperature can be, for example 15° C. to 40° C., or about 25° C. or varied between freezing and boiling of the liquid electrolyte.

Reference and counter electrodes can be used as known in the art. Quasireference electrodes can be used.

The electrolyte can varied as known in the art. It can be, for example, a quaternary ammonium salt. The anion of the electrolyte can be a fluorosulfonate such as triflate, $CF_3SO_3^-$.

As known in the art, the concentration of the lanthanide and/or actinide compound can be varied.

As known in the art, the scan rate of the electrochemical methods can be varied.

As known in the art, a sacrificial anode that contains lanthanides or actinides, or a mixture thereof, can be used.

In one embodiment, the ionically conductive or ionically permeable polymer film is a free standing film disposed between two electrodes as a separator.

Other common electrochemical conditions can be varied as known in the art.

Use of Magnets and Magnetic Materials

As noted above, a particularly important and preferred method for the electrochemical methods described hereinabove includes use of magnets and/or magnetic materials. For example, an aspect is a method comprising: electrochemically oxidizing and/or reducing at least one lanthanide, at least one actinide, or a combination thereof, irrespective of oxidation state, in a solvent system at at least one working electrode, wherein the solvent system comprises one or more organic solvents which have a dielectric constant of at least three and the water of the solvent system is less than about 25 wt. %; wherein the solvent system further comprises at least one electrolyte; wherein the at least one working electrode comprises at least one electronically conductive electrode substrate and at least one ionically conducting or ionically permeable film disposed on the substrate; wherein at least one ligand distinct from the ionically conducting or ionically permeable film is present as part of the lanthanide, the actinide, the electrolyte, or a combination thereof, wherein the ligand facilitates the oxidizing and/or reducing of the lanthanide, actinide, or combination thereof; wherein the ligand is chemically similar to a structure in the ionically conducting or ionically permeable film; and wherein the electrochemical oxidation and/or reduction is carried out under the influence of a magnetic field which favorably enhances the reaction.

Embodiments described hereinabove can also be used in the embodiments which use the magnetic field. For example, in one embodiment with use of the magnetic field, the step of electrochemically oxidizing and/or reducing is carried out on a lanthanide but not an actinide. In another embodiment, the step of electrochemically oxidizing and/or reducing is carried out on a mixture of lanthanide and actinide. In another embodiment, the step of electrochemically oxidizing and/or reducing is carried out on a mixture of at least two different lanthanides, or at least two different actinides. The lanthanide metals which can be used with the magnetic field are La, Ce, Pr, Nd, Pm, Sm, Eu, Gd, Tb, Dy, Ho, Er, Tm, Yb, and Lu. In one embodiment, the group of lanthanide metals is selected from La, Pr, Nd, Pm, Sm, Gd, Tb, Dy, Ho, Er, Tm, Yb, and Lu. In one embodiment, the lanthanide, irrespective of oxidation state, is Pr, Sm, Gd, Dy, or Yb. In some embodiments, the solvent has a dielectric constant of at least 5, or at least 8. In one embodiment, the ligand is a fluorosulfonate anion, and in another embodiment, the fluorosulfonate anion is part of the lanthanide compound.

Use of magnetic fields, materials, and particles has been described in the literature for various electrochemical applications. See, for example, US Patent Publications to Leddy et al. 2002/0004106; 2003/0232223; 2004/0026253; 2004/0137283; 2004/0234767; 2005/0084741; 2005/0213187; 2005/0214169; 2006/0130557; 2007/0009771; 2007/0056849; 2008/0295573; 2010/0092779; 2010/0173068; 2010/0291415; 2011/0214997; 2012/0088148; 2013/0308248; and 2014/0378016. In particular, US Publication to Leddy 2002/0012821 relates to lanthanides and actinides including separation devices and methods. In the '821 publication, lanthanides or actinides are separated en masse but not from each other, and the separation is based on mass transport, not based on electron transfer effects. One can use larger and stronger magnets for a particular application to achieve a desired effect.

The magnetic field can be applied by use of various embodiments. In one embodiment, the working electrode is magnetically modified. In one embodiment, the film disposed on the electronically conductive substrate is magnetically modified. In one embodiment, the lanthanides and/or actinides are subject to a magnetic field.

In one embodiment, the film is magnetically modified with use of magnetic particles. The particles can be, for example, nanoparticles or microparticles. The average diameter can be, for example, 10 nm to 50 microns, or 100 nm to 100 microns, or 500 nm to 25 microns. The amount of the magnetic particles in the film can be, for example, about 1 wt. % to about 20 wt. %, or about 2 wt. % to about 10 wt. %. This amount can be adapted for particular applications. Magnetic particles are generally known in the art as described, for example, in many of the Leddy patent documents. The film can comprise, as described above, a fluorosulfonate polymer, for example. A fluorosulfonate film can be used in conjunction with a fluorosulfonate ligand, so that the ligand has a similar chemical structure as found in the film.

Various structures of the particles can be present. For example, a core-shell structure can be present. The core can be the magnetic component, such as various forms of iron, whereas the shell can provide an inert or functional surface. The surface can be silanized, for example. One skilled in the art can select the magnetic materials.

Applications

Embodiments described herein, whether methods or devices, can be used in many applications. Existing uses of lanthanides and/or actinides can be adapted with use of the inventive methods and devices described herein. For example, lanthanides are used in many applications including nuclear medicines, contrast agents, reclamation of spent nuclear fuel, nuclear power industry, ORR, energy technologies where oxygen or air is the oxidant, such as fuel cells (e.g., hydrogen, alcohol, indirect reformation, and biofuel cells) and batteries (e.g., zinc air, lithium air, aluminum air, beryllium air, calcium air, iron air, magnesium air, potassium air, sodium air, and titanium air).

Lanthanides are heavy elements generated as nuclear waste products decay. Lanthanides are non-radioactive and can be recycled from nuclear waste for application in laser, medical imaging, and high power magnets. Lanthanides are commonly employed as petroleum refining catalysts and in catalytic converters. Lanthanides can be recycled from catalytic converters as are precious metal catalysts. Lanthanides also can be derived from ores such as bastnasite, monazite, and loparite.

In particular, the methods described herein can be used for various applications which involve lanthanide and/or actinides including separation and/or identification. Lanthanides can be difficult to separate from other lanthanides and actinides, and actinides can be difficult to separate from other lanthanides and actinides.

Other applications include, for example, $O_2$ generation/enrichment for medical or other purposes; refinement of spent (nuclear fuel or waste) or (medical isotope waste) as either cleaning removal of Ln or for enrichment; development of lanthanide materials as magnets, pure elements, films, alloys, as by plating for example; development of layered rare earth element (REE) magnets for tailored magnetic properties; and use in electrochemical energy systems as catalysts and structural material and electrode materials in batteries, fuel cells, supercapacitors, and the like, where the structure may be derived by electrochemical deposition or lanthanide intercalation or oxidation or reduction or extraction.

Devices and Methods Based on Oxygen Reduction Reaction

In another aspect, the oxygen reduction reaction (ORR) is a rate determining step in many processes and devices of electrochemical technologies such as fuel cells and batteries. In nonaqueous, aprotic solvents, for example, a quasireversible one electron reduction of $O_2$ is observed, which produces the paramagnetic superoxide radical $O_2^-$ [see, for example, Saveant, J.-M. *Chemical Reviews* 2008, 108, 2348-2378; Markovic, N. M. et al., Electrocatalysis at Well-Defined Surfaces: Kinetics of Oxygen Reduction and Hydrogen Oxidation/Evolution on Pt(hkl) Electrodes. In *Interfacial Electrochemistry: Theory, Experiment, and Applications*; Wieckowski, A., Ed.; Marcel Dekker, Inc: New York, 1999; and Song, C.; Zhang, J. Electrocatalytic Oxygen Reduction Reaction. In *PEM Fuel Cell Electrocatalysts and Catalyst Layers*; Zhang, J., Ed.; Springer London: London, 2008.]

$$O_2 + e^- \rightleftarrows O_2^-$$

However, generally, the limitations of the ORR reaction hinder the commercialization of many potentially useful electrochemical technologies.

More particularly, many common electrochemical energy systems exploit the ORR as an air fed cathode reaction. Many low temperature proton exchange membrane (PEM) fuel cells (e.g., hydrogen, alcohol fuels with direct and indirect reformation, formic acid, ammonia) exploit the air available oxygen so as to not increase system weight by carrying an alternative oxidant. Other examples include primary zinc air (hearing aid) and aluminum air batteries and secondary lithium air batteries. In metal air batteries, stability is often enhanced by use of nonaqueous electrolytes. The ORR is attractive for energy systems because oxygen is ubiquitously available in the atmosphere and the thermodynamic potential for the ORR is high. However, the kinetics of the ORR are slow and energy is lost to ORR kinetics on discharge of (lower temperature) oxygen fed electrochemical energy systems. Improved ORR kinetics improves the efficiency, energy, and power density of many electrochemical energy systems.

In addressing these needs for an improved ORR, one embodiment provides for an electrochemical device, wherein the device comprises at least one cathode, and at least one anode, and at least one electrolyte between the cathode and the anode, wherein the device in operation is adapted to employ the oxygen reduction reaction (ORR) at the cathode, and wherein the cathode is magnetically modified, or the electrolyte comprises at least one lanthanide and/or actinide compound, or both, wherein the ORR reaction is enhanced by the cathode modification or the use of lanthanide and/or actinide.

In one embodiment, the cathode is magnetically modified, but the electrolyte does not comprise at least one lanthanide and/or actinide compound. In another embodiment, the cathode is not magnetically modified, but the electrolyte does comprise at least one lanthanide and/or actinide compound. In yet another embodiment, the cathode is magnetically modified, and the electrolyte does comprise at least one lanthanide and/or actinide compound. In yet another embodiment, the cathode is magnetically modified, and the electrolyte comprises at least one lanthanide compound, or both. In yet another embodiment, the cathode is not magnetically modified, but the electrolyte does comprise at least one lanthanide compound.

In one embodiment, the cathode is magnetically modified with use of a film comprising a magnetic material. In one embodiment, the cathode is magnetically modified with use of a film comprising magnetic particles. In one embodiment, the cathode is magnetically modified with use of a film comprising magnetic particles and a fluorosulfonic acid polymer. Further examples of these embodiments are described herein.

In one embodiment, the at least one lanthanide and/or actinide compound comprises trifluoromethanesulfonate.

Cathodes, anodes, and electrolytes are well known for electrochemical devices including fuel cells, batteries, as well as metal air batteries. In a preferred embodiment, the electrolyte is a non-aqueous electrolyte. In a preferred embodiment, the solvent acetonitrile is used. The electrolyte can include an ammonium salt such as, for example, tetrabutylammonium tetrafluoroborate.

A variety of devices make use of the ORR as known in the art. These include various types of fuel cells and various types of batteries, including primary and secondary batteries, and one embodiment includes wherein the device is a battery or fuel cell. In another embodiment, the device is a metal air battery.

Another embodiment provides for a method of use of an electrochemical device, wherein the method comprises generating electrical current from a device which comprises at least one cathode, and at least one anode, and at least one electrolyte between the cathode and the anode, wherein the device in operation is adapted to employ the ORR at the cathode, and wherein the cathode is adapted to be magnetically modified, or the electrolyte is adapted to comprise at least one lanthanide and/or actinide compound, or both, wherein the ORR reaction is enhanced by the cathode and/or electrolyte adaptations.

EXAMPLES AND WORKING EXAMPLES

Additional embodiments are provided in the following non-limiting examples and working examples.

Examples Part 1: Lanthanide Electrochemistry without Magnetized Film

Methods and Materials

Platinum electrodes were modified with NAFION® films. Lanthanide trifluoromethanesulfonate compounds were electrochemically evaluated in an acetonitrile system. The film and solution preparation, system setup, and electrochemical analysis are described below.

Electrode and Solution Preparation

Platinum electrodes (Pine Instruments, A=0.452 cm$^2$) were polished successively with 1.0, 0.3, and 0.05 m alumina, rinsed in nitric acid, then rinsed with 18 MΩ water and dried in air before film modification. NAFION films were made by casting 5.0 μL of NAFION solution (5% w/v suspension of NAFION in aliphatic alcohols and water, 1100 eq wt, Aldrich) on the electrode surface, then allowing the casting solvents to evaporate in air for 24 hours. The electrode was held in a stand so that the planar electrode surface faced up, parallel to the table. A Teflon hollow cylinder was placed around the electrode to protect it from dust but still allow air flow. Based on the casting volume of 5.0 μL, the density of NAFION in acetonitrile, and the electrode area, the film was calculated to be about 7 microns thick when immersed in the acetonitrile solution.

Redox probes were all anhydrous lanthanide (III) trifluoromethanesulfonate compounds (99.9+% pure, Sigma), referred to generally as LnOTf (i.e., Ln in "LnOTf" refers to a generic description of any of the 15 possible lanthanide compound with triflate rather than a specific single lanthanum compound with triflate). Solutions of LnOTf and electrolyte tetrabutylammonium tetrafluoroborate (TBABF$_4$, Sigma) in acetonitrile (Fisher, dried over 4 A molecular sieves) were used for all electrochemical measurements. Trifluoromethanesulfonate (i.e., "triflate") is a ligand that closely resembles NAFION side chains, having a sulfonate group linked to a fluorocarbon moiety. Three triflate ligands chelate one lanthanide atom in its 3$^+$ oxidation state. For most experiments, solutions were 1.00 mM LnOTf and 0.10 M TBABF$_4$. When other concentrations were noted, the ratio of electrolyte to redox probe remains 100:1. Lanthanide trivalent cations were investigated as triflate salts of ytterbium (Yb), samarium (Sm), dysprosium (Dy), praseodymium (Pr), and gadolinium (Gd). Copper (II) triflate was also investigated.

Background/blank measurements were made in acetonitrile with 0.10 M TBABF$_4$ only. A blank solution saturated with oxygen was analyzed as well. The concentration of saturated O$_2$ (g) in acetonitrile was calculated to be 8 mM based on the value for O$_2$ (g) concentration in acetonitrile in air and experimentally measured currents for a solution equilibrated in air and one saturated with O$_2$ (g). This saturated O$_2$ (g) concentration agrees with a reported value.

Electrochemical Measurements

A three electrode setup was used for all electrochemical measurements. All measurements were made in the LnOTF and TBABF$_4$ acetonitrile solutions except as noted. Films equilibrated for 5 hours in the acetonitrile electrolyte before applying a potential, and reequilibrated for 30 minutes between each scan. The redox probe took less time to equilibrate into NAFION in acetonitrile than in water. This is confirmed by measurements taken at intervals after the NAFION modified electrode was placed in the probe solution until a reproducible maximum current was achieved. Nitrogen was bubbled into the solution between scans and a nitrogen blanket was maintained during scans, except for measurements on oxygen as noted. A three neck flask was modified with an additional inlet. Each electrode was inserted through one of the joints. A gas line was fed through the fourth joint. All openings were parafilmed to maintain an inert atmosphere under nitrogen sparge. Triplicate measurements were completed for each lanthanide triflate and at each scan rate. The working electrode was a platinum disk (Pine Instruments, A=0.452 cm$^2$), the counter electrode was platinum mesh, and the reference electrode was a Ag/AgO quasireference electrode (QRE) made by immersion of a freshly sanded Ag wire in concentrated $HNO_3$ for 10 minutes. Ferrocene (+0.64 V vs NHE) was used as an internal reference.

Cyclic voltammetry was performed (CH Instruments 760B potentiostat) at scan rates 20, 50, 75, 150, and 200 mV/s in a randomized order. The potential was swept from +1.5 V to −2.0 V to +2.0 V vs. Ag/AgO QRE; the forward sweep was then immediately repeated from +2.0 V to −2.0 V. In a separate cyclic voltammetric experiment, only the first reduction of Ln(III)OTf was investigated by limiting the potential sweep from +1.5 V to −0.8 V to +1.5 V.

A concentration study was carried out: a solution of 0.490 mM YbOTf was prepared, and a NAFION film modified electrode was equilibrated and analyzed as described above. Then, a mass of YbOTf was added to the solution such that the new concentration was 1.89 mM. The film was reequilibrated for 5 hours and the same measurements performed. This was repeated for concentrations of 3.31 mM and 5.00 mM YbOTf as well. Cyclic voltammetric peak currents scaled well with concentration of the redox probe, and voltammetric morphologies were largely invariant consistent with no significant side reactions that would be associated with any adventitious contaminants (e.g., water).

In an experiment to evaluate water effects, an initial volume of 100 mL of 1.00 mM YbOTf and 0.10 M $TBABF_4$ in mole sieve dried acetonitrile was analyzed as described above. Then, 1.00 mL of water was added for a 1.27 w/w % concentration of water in the solution, the solution reequilibrated for 30 minutes with $N_2$ (g) and the measurements were repeated. Another 1.00 mL of water was added for a total of 2.00 mL water or 2.54 w/w % water in the system, the solution reequilibrated, and the measurements were repeated. These steps were repeated again for totals of 5.00 mL and 10.00 mL of water (6.35 and 12.7 w/w % water) as well. On successive additions of water to the electrolyte starting at 1.27% water concentration, water reduction and oxidation waves were observed and found to increase in current and to shift to less extreme potentials as water content increased to 15% water.

An additional experiment to investigate the role of the NAFION film was performed by equilibrating an electrode modified with a NAFION film in 1.00 mM YbOTf for 5 hours, then removing it to a blank solution of $N_2$ (g) sparged 0.10 M $TBABF_4$ electrolyte in acetonitrile. A voltammogram at 200 mV/s cyclic voltammetry was immediately undertaken. The scan was repeated 5 times continuously to see if a minimum current threshold was reached, then electrolyzed at −0.4 V for 10 minutes. The experiment suggested YbOTf was not tightly held.

X-Ray Photoelectron Spectroscopy

Platinum foil (Sigma) electrodes approximately 0.5×1.0 cm were soaked in concentrated $HNO_3$ for one hour, then rinsed with 18 MΩ water and air dried in air. 1.0 μL NAFION films were cast for an end thickness of about 2 microns and the films were dried in air 24 hours. The foil electrodes were equilibrated in a 1.00 mM YbOTf and 0.10 M $TBABF_4$ acetonitrile solution. Then, either the electrodes were removed from the solution or they were electrolyzed at −0.4 V to reduce the Yb(III)OTf for ten minutes before removal from solution. The electrodes were then rinsed with acetonitrile and stored in a vacuum desiccator until XPS analysis. XPS analysis confirmed that the Yb(III) was reduced to Yb(II) on polarizing the electrode to −0.4 V vs Ag|Ag O for ten minutes.

Figure 2:
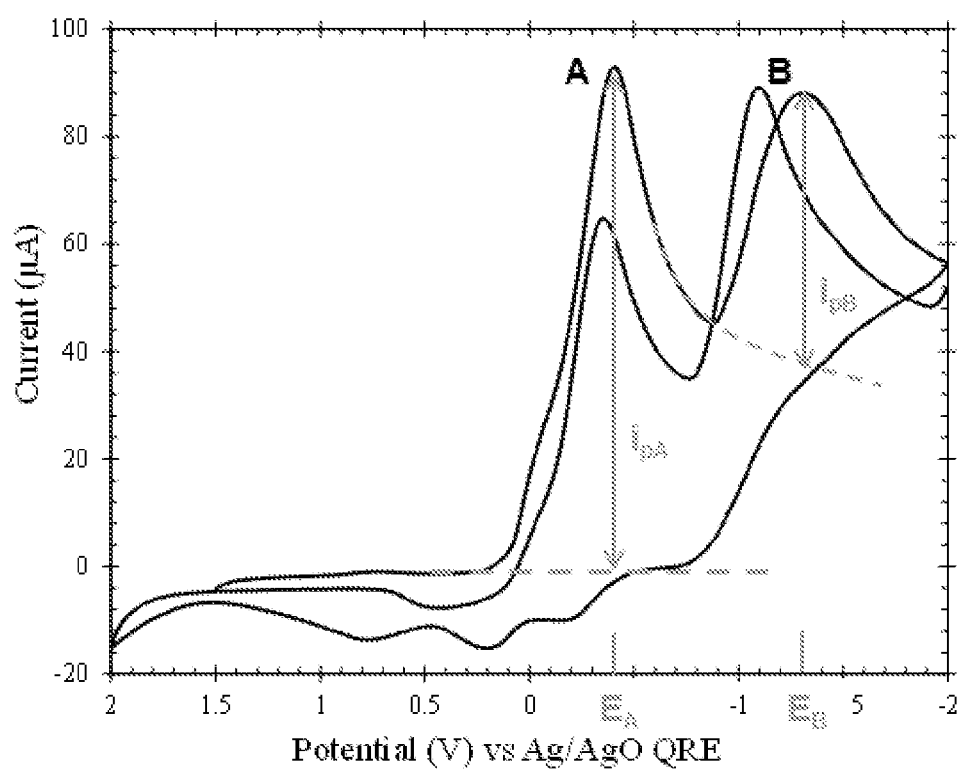

The experiments associated with FIGS. 1-6 are now reviewed. FIG. 1 is a 20 mV/s cyclic voltammogram of the first and second sweep for a NAFION modified platinum electrode equilibrated in ytterbium triflate. The voltammograms show (a) two effective reduction processes on the first and second sweeps toward negative potentials and (b) less effective oxidation processes as the potential was scanned toward positive potentials. The inset is a 200 mV/s cyclic voltammogram of the first reductive wave only where greater oxidation current was found than when the negative potential sweep includes both strong reduction waves. The inset is a 200 mV/s cyclic voltammogram of the first reductive wave. Upon the first sweep, there were two main reduction peaks, which will be called A and B as shown in FIG. 2. FIG. 2 also demonstrates how the peak current for peak A (called $i_{pA1}$ for the first sweep and $i_{pA2}$ for the second sweep) is measured from the baseline current and the B peak current ($i_{pB1}$ and $i_{pB2}$) was measured from the extrapolated mass transport decay of peak A. Peak A and Peak B were identified on the initial reductive sweep unless otherwise noted. The potential at which $i_{pA}$ occurs is called $E_A$ and the potential at which $i_{pB}$ occurs is called $E_B$. The potential difference between peaks A and B is called $\Delta E_{AB}$ and calculated as shown in Equation 1.

$$\Delta E_{AB} = |E_B - E_A| \quad (1)$$

Analysis focuses on the reductive waves and first sweeps. $\Delta E_{AB}$ was used as a characteristic because the oxidative waves are so poorly resolved that half wave potentials were difficult to determine. $E_{p/2}$ is a crude estimate of the formal potential $E^0$ calculated as halfway between $E_f$ and $E_r$. $E_{p/2}$ values were calculated for peak A from the cyclic voltammograms that only scan the first redox reaction as in the inset of FIG. 1; similarly, forward and reverse peak current ratios and peak splittings are also drawn from voltammograms that record only peak A.

Peak currents are a measure of reaction efficiency or rate. Peak potentials are an indication of the energy required to drive a reaction. For the lanthanides, the standard reduction potentials are largely invariant across the lanthanide series. Here the peak potentials approximate the formal potentials for the reactions under the specified experimental conditions. Differences in $\Delta E_{AB}$ with lanthanide element suggest shifts in the formal potentials and perhaps in the kinetic efficiency of the reduction processes.

Figure 3:
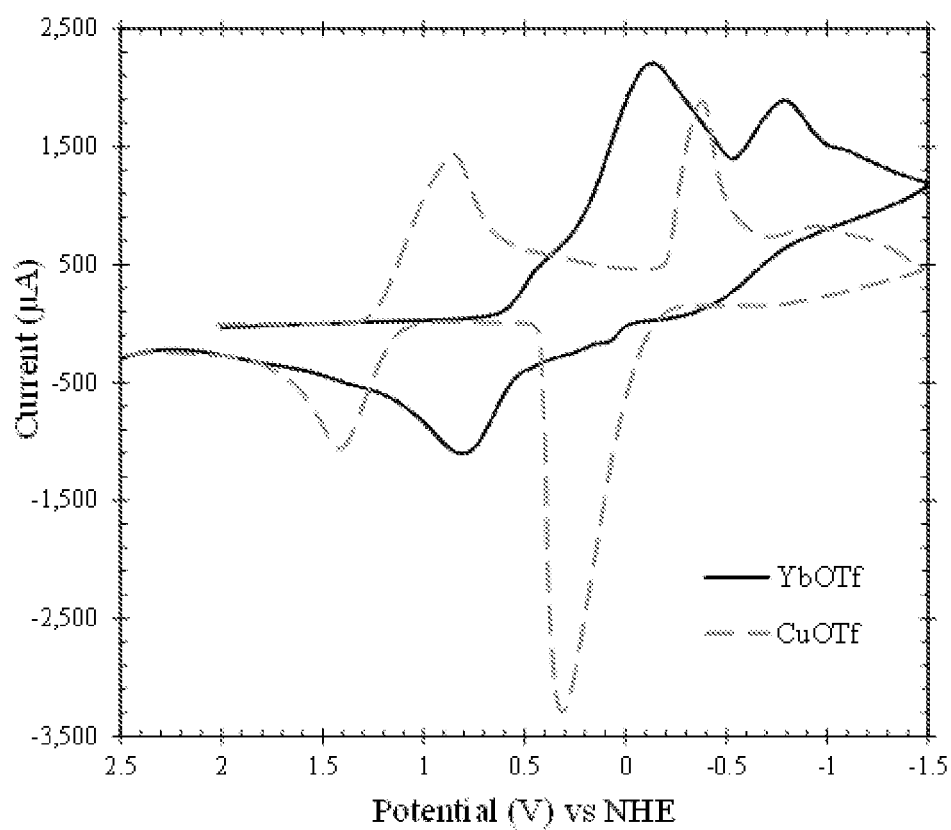

FIG. 3 is an overlay of 20 mV/s cyclic voltammograms for copper triflate and ytterbium triflate. Other than replacing the ytterbium with copper, the system experimental variables were the same. However, copper triflate voltammetry differs markedly from ytterbium triflate voltammetry. Potentials were normalized to NHE to be certain the observed peaks are at different potentials. This is another confirmation that the observed currents were due to lanthanide redox behavior and not triflate redox behavior. It was noted that the copper triflate exhibits a strong Cu(0) stripping wave for removal of copper metal from the electrode surface. The ytterbium triflate did not show evidence of ytterbium metal deposition.

Figure 4:
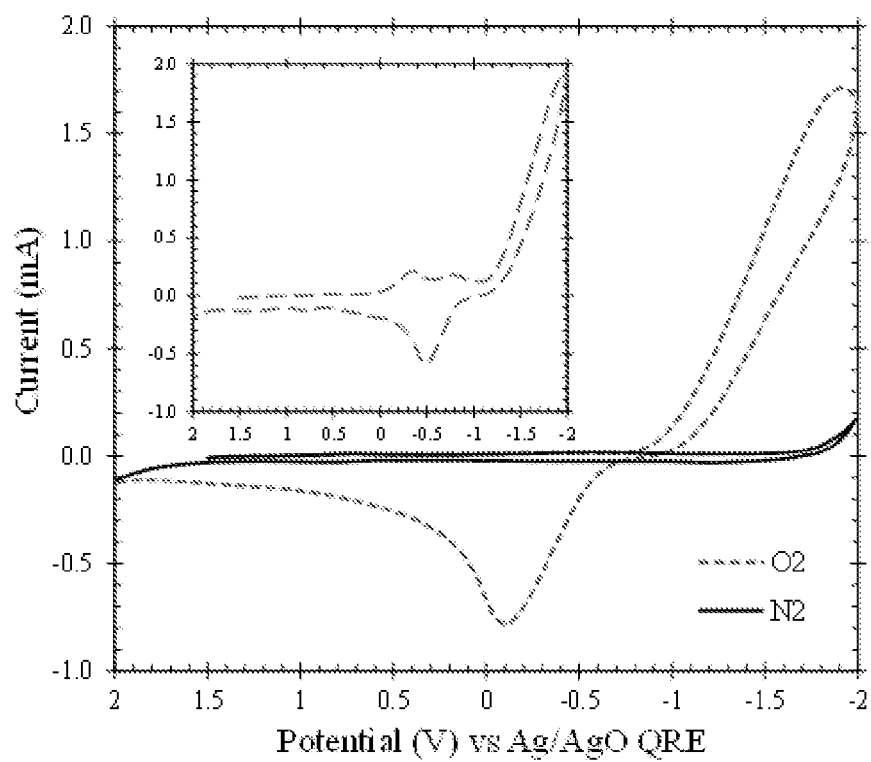

An $O_2$ (g) saturated (about 8 mM) electrolyte without triflate was overlaid with the $N_2$ (g) sparged electrolyte at a NAFION modified platinum electrode in a $TBABF_4$ only solution in FIG. 4, which demonstrates that the peaks observed in ytterbium triflate systems were not due to oxygen reduction reaction. An $O_2$ (g) saturated ytterbium triflate solution is shown in the inset. The two LnOTf reductive peaks were distinct from the ORR peak observed at more negative potential.

When the electrode was equilibrated in YbOTf and then removed to a blank electrolyte solution, the current was immediately lower. Repetitive scans do not decrease below a threshold current level. This indicates that some YbOTf remains well extracted into the NAFION film and was recycled by the cyclic voltammetry. When still in a bulk solution of YbOTf, redox probe from the solution must be readily available to exchange into the film during analysis to maintain the higher currents.

In more experiments, 20 mV/s and 200 mV/s cyclic voltammograms of SmOTf, DyOTf, GdOTf, and PrOTf were also obtained. The cyclic voltammograms for all lanthanides were similar. See FIG. 5 for all lanthanide voltammograms on the same potential axis. Values of $\Delta E_{AB}$ vary slightly with lanthanide. Samarium appears more reversible than the others. The praseodymium B peak exhibits evidence of two consecutive reduction reactions, which may be $Pr^{2+}+e \rightleftharpoons Pr^{1+}$ and $Pr^{1+}+e \rightleftharpoons Pr^0$ where the Ln(0)OTf likely remains solubilized as a neutral species in the ion exchange polymer. For the other lanthanide triflates in FIG. 5, Peak B likely corresponds to a concerted two electron reduction $Ln^{2+}+e \rightleftharpoons Ln^0$. This mechanism was supported by computer simulations, but is not binding and the proposed mechanism does not limit the described and claimed inventions.

Figure 5:
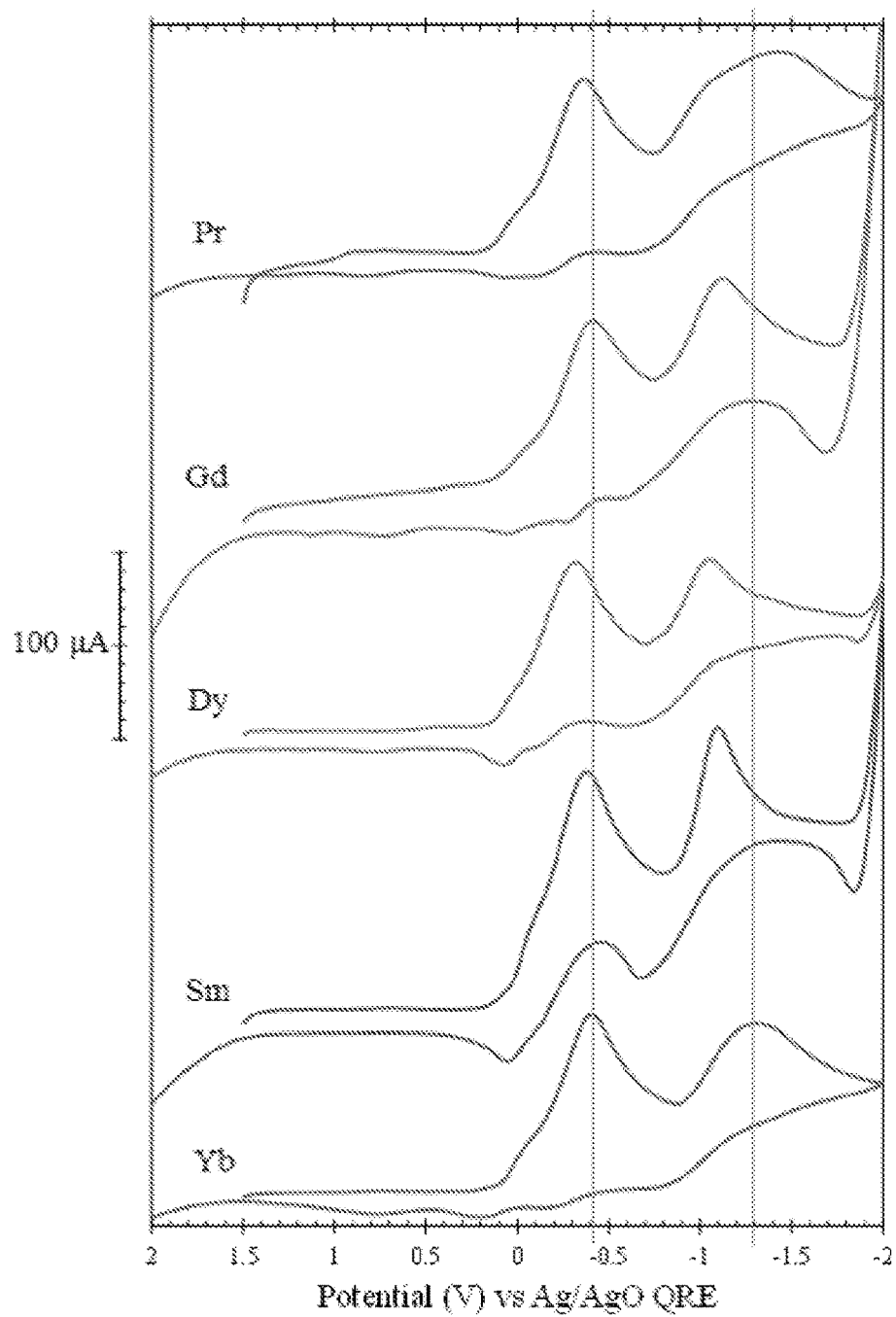
Figure 6:
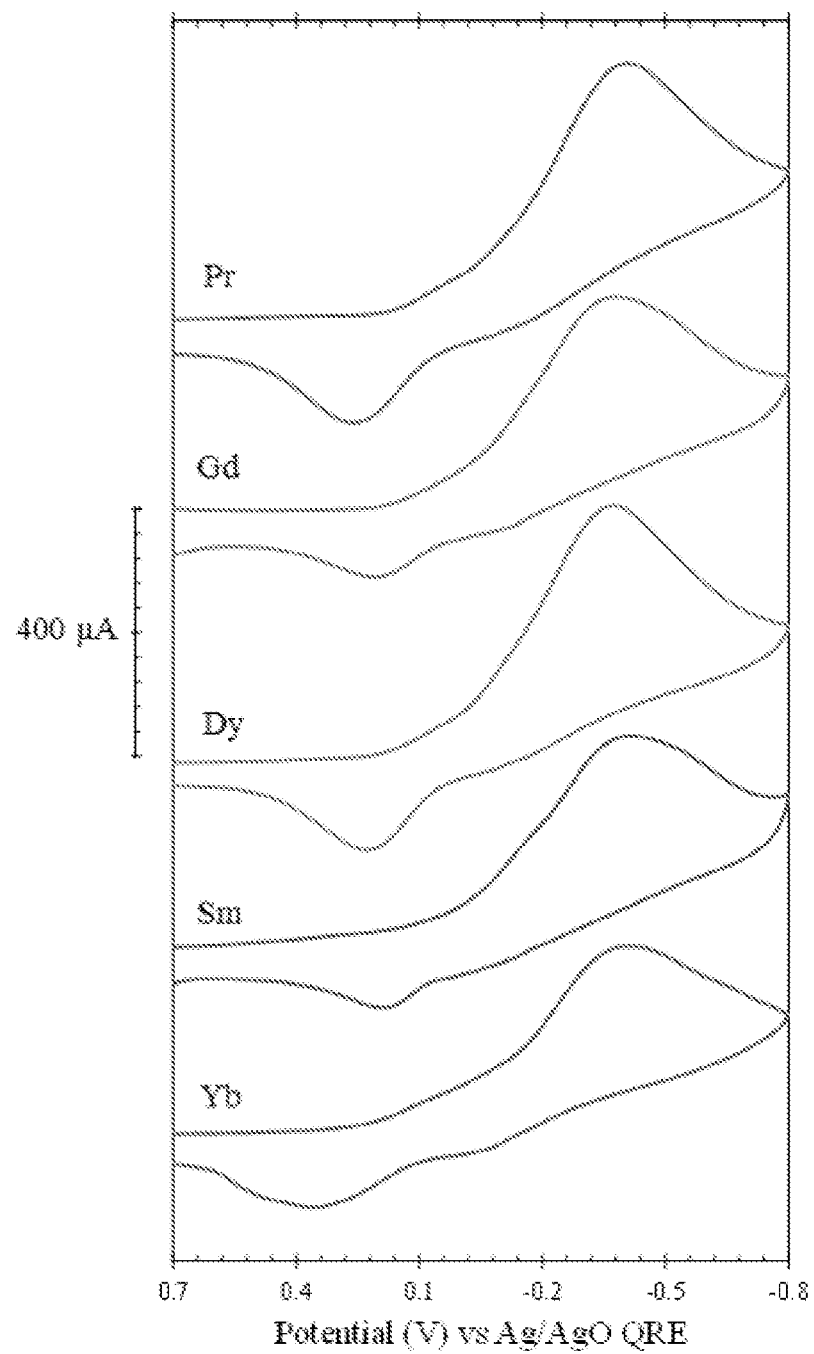

In FIG. 5, the voltammograms for all lanthanides are shown together; the morphologies for all were similar with some difference in peak potential observed for the different lanthanides. In FIG. 6, the first redox waves (only peak A scanned) were also shown to have common morphologies with some shifts in peak potential. Similar morphologies and potentials for the first reductive wave (peak A) were observed in molten salts and ionic liquids for Yb, Sm, and Eu. Authors assign peak A to the $3^+/2^+$ redox couple but provide no evidence. For ionic liquids, most papers also use lanthanide triflate compounds and triflate related anions. Triflate compounds seem to be especially soluble in ionic liquids where the anion is either tetrafluoroborate ($BF_4^-$) or a trifluoromethanesulfonyl derivative (OTf$^-$, TFSI$^-$, bis(trifluoromethanesulfonyl)amide). Ohno, et al. bind Yb(OTf)$_3$ to a sodium sulfonate compound and determine that one of the triflates is replaced by the sodium sulfonate compound [Ohno, Y. *Journal of Electron Spectroscopy and Related Phenomena* 2008, 165, 1-4.]. While the presently claimed inventions are not limited by theories, it seems likely that the sulfonates in NAFION may do the same thing in this system. Toyoshima, et al. design a flow cell to detect lanthanides using NAFION films on carbon cloth. [Toyoshima, A et al. *Radiochimica Acta* 2008, 96, 323-326.]

Additional data for Part 1 are provided below in Table 1 (N Films):

TABLE 1

Peak Potentials and Peak Currents for Non-Magnetic NAFION Films and Magnetic Microparticle Composites on Pt Electrodes for Five Lanthanide Triflates in Acetonitrile with 0.1M TBABF$_4$. N is for NAFION films and C1 is for NAFION magnetic particle composites.

| Film | Ln | $E_A$ (V) | $E_B$ (V) | Peak Forward Currents (μA/mM) | | | |
|---|---|---|---|---|---|---|---|
| | | | | $i_{pA1}$ | $i_{pB1}$ | $i_{pA2}$ | $i_{pB2}$ |
| N | Yb | $-0.38_2 \pm 0.01$ | $-1.11 \pm 0.01$ | $74.7 \pm 1.5$ | $78.0 \pm 1.6$ | $72.1 \pm 1.3$ | $76.5 \pm 1.5$ |
| | Sm | $-0.38_2 \pm 0.02$ | $-1.10 \pm 0.02$ | $89.8 \pm 1.8$ | $87.5 \pm 1.8$ | $85.5 \pm 2.0$ | $80.8 \pm 1.5$ |
| | Dy | $-0.33_2 \pm 0.01$ | $-1.06 \pm 0.01$ | $88.1 \pm 1.7$ | $94.0 \pm 2.1$ | $97.7 \pm 3.0$ | $97.4 \pm 1.6$ |
| | Gd | $-0.41_0 \pm 0.05$ | $-1.12 \pm 0.02$ | $92.4 \pm 2.0$ | $106 \pm 3$ | $89.5 \pm 1.6$ | $94.2 \pm 2.1$ |
| | Pr | $-0.36_1 \pm 0.01$ | $-1.42 \pm 0.10$ | $91.7 \pm 2.3$ | $130 \pm 5$ | $95.1 \pm 2.1$ | $98.6 \pm 2.8$ |
| C1 | Yb | $-0.30_4 \pm 0.01$ | $-1.10 \pm 0.01$ | $89.4 \pm 3.0$ | $100 \pm 4$ | $92.9 \pm 2.0$ | $96.2 \pm 1.5$ |
| | Sm | $-0.31_7 \pm 0.01$ | $-1.07 \pm 0.08$ | $92.4 \pm 1.1$ | $116 \pm 2$ | $86.5 \pm 0.8$ | $115 \pm 2$ |
| | Dy | $-0.24_6 \pm 0.01$ | $-1.01 \pm 0.01$ | $126 \pm 3$ | $132 \pm 5$ | $116 \pm 2$ | $125 \pm 3$ |
| | Gd | $-0.304 \pm 0.001$ | $-1.05 \pm 0.05$ | $86.0 \pm 1.5$ | $128 \pm 4$ | $81.8 \pm 1.2$ | $92.6 \pm 1.7$ |
| | Pr | $-0.33_2 \pm 0.03$ | $-1.12 \pm 0.01$ | $103 \pm 2$ | $119 \pm 3$ | $93.1 \pm 1.8$ | $114 \pm 2$ |

Additional comments are provided for Table 1:

Peak potentials and peak currents for Wave A and Wave B are summarized (3 replicates) in Table 1 for each of five lanthanide triflates in acetonitrile at each NAFION films and NAFION C1 micromagnet composites. Variations in peak potentials are observed for the lanthanides at both the NAFION films and NAFION C1 composites (data for NAFION C1 composites are discussed in more detail below in Part II).

For NAFION films (N), the peak potentials at $E_A$ are in the order Dy>Pr≳Yb, Sm>Pr; at $E_B$, the order is Dy>Yb, Sm, Gd>Pr. Thus, the potentials for the lanthanides are varied when NAFION, triflate, and acetonitrile are used. The order of the reduction processes differ for wave A and wave B. Because the sequence of peak potentials for the reductions is different for waves A and B, some separation of species can be achieved when no magnets are present.

In sum, for the working examples of Part I, a relatively inexpensive, readily assessable benchtop method to analyze lanthanides electrochemically has been developed. Mercury electrodes, ionic liquids, and molten salts are avoided. NAFION solubilizes the lanthanide compounds, possibly by replacement or equilibrium of a triflate ligand with a sulfonate group. Acetonitrile widens the accessible potential window and shifts the formal potential of the lanthanides through solvation effects. Ligand complexation by the triflate also shifts the formal potential. The unexpected, observed differences in peak potentials and control of the electrode potential can provide for some increased degree of separation and discrimination between different lanthanides. Lanthanides can be detected in this system in two steps: complexation with triflates and electrochemical analysis.

Examples Part II: Lanthanide Experiments with Magnetically Modified Films

Methods and Materials

Platinum electrodes were modified with NAFION films and with magnetized composites of chemically inert, magnetic particles (microparticles) suspended in a NAFION® film. Trifluoromethanesulfonate compounds were electrochemically evaluated in an acetonitrile system. Analysis was done by cyclic voltammetry in a three electrode setup. The film preparation, magnetization, and electrochemical analysis are described below. Many of the protocols were as described above in Part I.

Electrode and Solution Preparation

Platinum electrodes (Pine Instruments, A=0.452 cm$^2$) were prepared as above. Electrodes were modified with either a NAFION only film or a composite of methylsiloxane coated maghemite microparticles (SiMag-C1, volume magnetic susceptibility 16.1±0.8 μcgs) in NAFION. NAFION only films were prepared as described above.

Commercially produced magnetic microparticles, called SiMag-Cx, were purchased from Chemicell, GmbH. The SiMag-Cx particles consist of a maghemite ($Fe_2O_3$, $\gamma$-$Fe_2O_3$) core with an alkyl-siloxane coating that renders the particles chemically and electrochemically inert. The core particles were 1 micron in diameter. Effectively, SiMag-Cx microparticles serve as non-porous magnetic silica particles. Three types of coatings with different lengths of alkyl chains (number of carbons=x=1, 3, or 8) were used. SiMag-C1 particles have a methyl-siloxane coating, SiMag-C3 particles have a propyl-siloxane coating, and SiMag-C8 particles have an octyl-siloxane coating. Maghemite is ferrimagnetic and held in the magnetic field of a permanent magnetic field while composites were formed. Once magnetized, cores of >1 micrometer diameter are of sufficient size to sustain a permanent magnetic field in the absence of an applied field.

To prepare magnetized composites of NAFION and SiMag-C1 particles, an aqueous suspension of particles was mixed in a microcentrifuge tube with the NAFION suspension in a 1:20 volumetric ratio to yield a 6% w/w loading of particles in the dry composite film. Immediately before casting the film, the solution was briefly vortexed (5 seconds) to ensure even suspension of the particles and NAFION. Then, 5 μL of the NAFION+SiMag-C1 solution was cast onto the electrode surface in a manner similar to the NAFION film. A NdFeB ring magnet (o.d.=7.6 cm, i.d.=3.8 cm, 1.3 cm height) was placed around the electrode such that the electrode was in the center of the ring and the electrode surface was in the same plane as the magnet. A Teflon cylinder was placed around the electrode to protect it from dust but still allow air flow, and the film air dried for 24 hours. The ring magnet was removed after the first hour. On visual inspection, the NAFION only and NAFION+SiMag-C1 films looked the same.

Redox probes were the same lanthanide trifluoromethanesulfonate compounds used for the simple NAFION films, Yb, Sm, Dy, Pr, and Gd. The electrolyte was again tetrabutylammonium tetrafluoroborate ($TBABF_4$) in acetonitrile. For most experiments, solutions were 1.00 mM LnOTf and 0.10 M $TBABF_4$ with other concentrations noted. Background/blank measurements were made with 0.10 M $TBABF_4$ only in acetonitrile.

Electrochemical measurements were carried out as described above in Part One.

When possible, the same solution was used for the NAFION films and NAFION+SiMag-C1 composite films. Otherwise, currents were normalized by concentration of the redox probe. Data for electrodes modified with NAFION only films are labelled "N," and data for electrodes modified with NAFION+SiMag-C1 composites are labelled "C1." Analysis focuses on how the introduction of magnetic microparticles changes the cyclic voltammetric response with specific focus on changes in the difference in the peak potentials between waves A and B, $\Delta\Delta E_{AB}$ (where $\Delta E_{AB}=|E_B-E_A|$ and $\Delta\Delta E_{AB}=\Delta E_{AB;C1}-E_{AB;N}$) and changes in peak currents and peak potentials at A and B.

Figure 7:
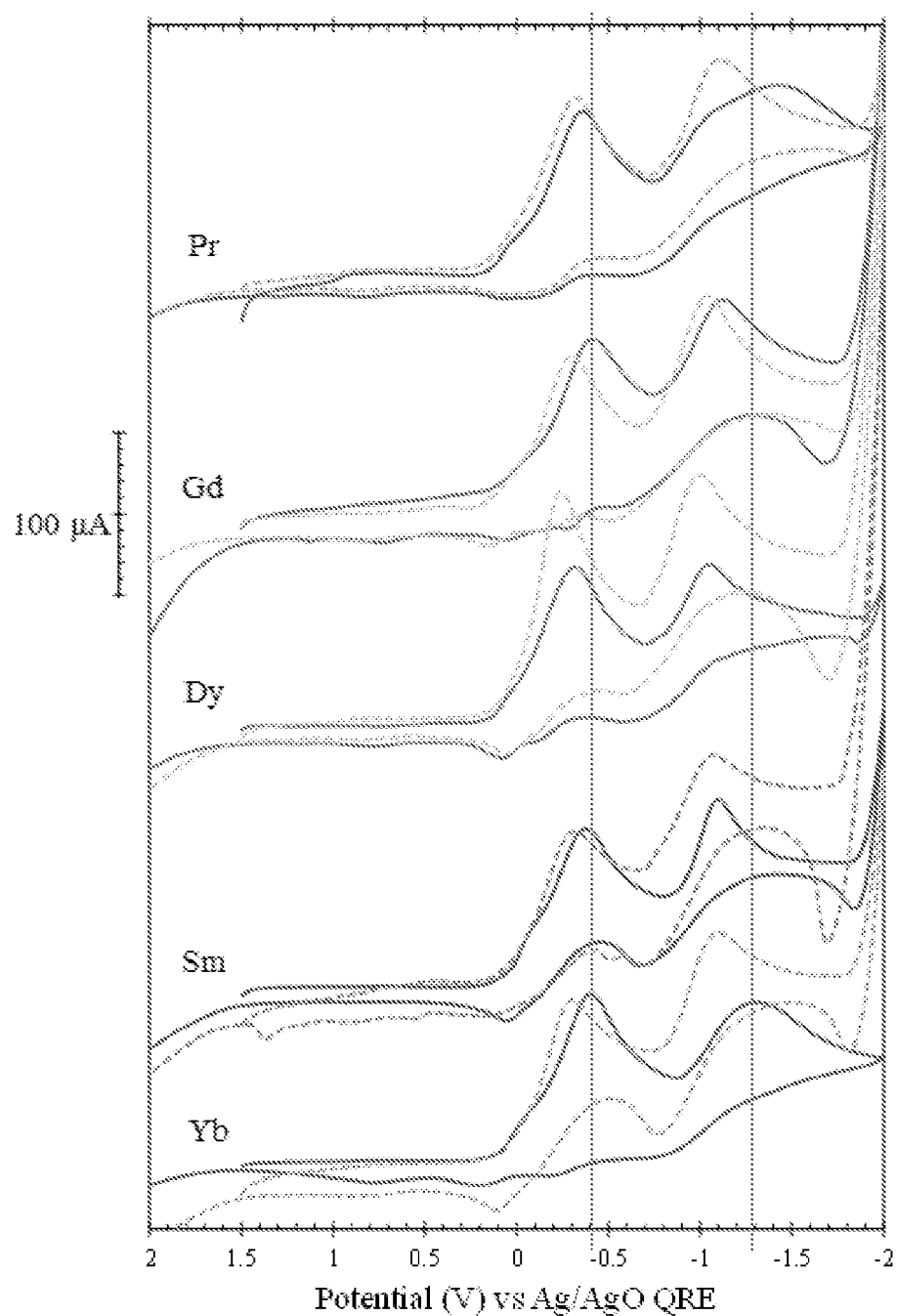

FIG. 7 shows overlays of 20 mV/s scans of the lanthanide triflates at electrodes modified with NAFION films and with NAFION+SiMag-C1 composites on the same plot.

From the data, the peak potentials for the waves A and B were closely grouped for each NAFION films and magnetic composites. But the relative positions of the peaks were spaced differently for NAFION compared to composites. By selective use of magnetic modification and NAFION films, the lanthanides can be separated because application of the field shifts potentials. For this discussion, the peak A and B potentials were used to crudely approximate the formal potentials. The experimental peak potentials may include substantial kinetic effects that can also be altered by magnetic fields. Kinetics provide an alternative means to separate the lanthanide species. The separations based on kinetics differ by mechanism but the general qualitative trends in the behavior were anticipated to be similar to the Nernstian model. Further, the magnetic microparticles used in these studies sustain small fields. With microparticles able to sustain stronger fields, larger potential shifts are anticipated.

In sum, magnets enhance the differences in the voltammetric responses for these several lanthanide complexes. The peak A and peak B currents change differently for different LnOTfs and the potential differences between peaks A and B also change differently for different LnOTfs. This demonstrates that magnets can improve identification and separation of lanthanides. The use of magnetic materials, ligated lanthanides, and organic solvents on the benchtop can at least reduce the number of steps to identify and separate lanthanide species. Use of a series of different ligands in conjunction with control of the electrode potential can further improve separation efficiency. A Nernstian model suggests peak potential shifts as small as 50 to 100 mV would be effective for separation. One lanthanide triflate could be electrolyzed to a 2+ state while the other remained 3+. Then, the 2+ lanthanide could be complexed and removed from solution, leaving behind the 3+. There are many variations on such a charge based separation; the matrix here provides access to lanthanide electrochemistry and increased discrimination in the various lanthanide species based on shifts in formal potentials and peak potentials driven by ligation and magnetic field. Particles able to sustain stronger magnetic fields can create yet larger potential shifts that can be exploited for more effective separation at lower cost and complexity.

The data in Table 1 are now described more. For C1 magnetic composites (C1), the peak potentials at $E_A$ are in the order Dy>Gd, Yb, Sm>Pr; at $E_B$, the order is Dy> Gd ≳ Sm ≳ Yb ≳ Pr. Thus, the potentials for the lanthanides are varied when NAFION, triflate, acetonitrile, and magnets are used. The order of the reduction processes differ for wave A and wave B. Further the order of the reduction processes are different with and without magnets for waves A and B. Because the sequence of peak potentials for the reductions is different for waves A and B, some separation of species can be achieved when magnets are present.

Separations, Example Protocols, and Effectiveness of the Potential Shift

Finally, based on the data shown in Table 1, example separation protocols can be developed. The examples can be based on separation of a mixture of all five lanthanide triflates present as Ln(III), all at the same concentration, each with formal potentials approximated by $E_A$ and $E_B$. The separation is predicated on potential differences of at least 30 mV (satisfied in all cases but one). Examples for each without micromagnets, with magnetic modification, and a combination of with and without magnetic modification are presented.

Example A

For one working electrode modified with a NAFION film (no magnetic modification) in an electrolyte of $TBABF_4$ in acetonitrile, the following protocol at the single working electrode allows separation of all lanthanides except Sm+Yb.

| Solution Composition | Separated | Wave | ΔE | Protocol |
|---|---|---|---|---|
| Dy(III) + Gd(III) + Pr(III) + Sm(III) + Yb(III) | | | | Initial Composition |
| Dy(II) + Gd(III) + Pr(III) + Sm(III) + Yb(III) | Dy(II) | A | 30 | 1) →Dy(II), remove Dy(II) |
|  | Gd(III) | A | 30 | 2) →Pr(II), Yb(II), Sm(II), |
| Gd(III) + Pr(II) + Sm(II) + Yb(II) | | | | remove Gd(III) |
|  | Pr(II) | B | 30 | 3)→Sm(I/0), Yb(I/0), |
| Pr(II) + Sm(I/0) + Yb(I/0) | | | | remove Pr(II) |
| Sm(I/0) + Yb(I/0) | | | | *Mixture of Sm + Yb remains |

Example B

For one working electrode modified with a NAFION film+magnetic modification in an electrolyte of $TBABF_4$ in acetonitrile, the following protocol at the single working electrode allows separation of all lanthanides except Sm+Gd. (All separations at 30 mV, except step 2.)

| Solution Composition | Separated | Wave | ΔE | Protocol |
|---|---|---|---|---|
| Dy(III) + Gd(III) + Pr(III) + Sm(III) + Yb(III) | | | | Initial Composition |
| Dy(III) + Gd(III) + Pr(III) + Sm(III) + Yb(III) | Dy(II) | A | 60 | 1)→Dy(II), remove Dy(II) |
|  | Pr(III) | A | 20 | 2) →Gd(II), Yb(II), Sm(II), |
| Gd(II) + Pr(III) + Sm(II) + Yb(II) | | | | remove Pr(III) |
| Gd(III) + Sm(III) + Yb(II) | Yb(II) | B | 30 | 3)→Sm(III), Gd(III), remove Yb(II) |
| Gd(III) + Sm(III) | | | | *Mixture of Sm + Gd remains |

Example C

For two working electrodes, one with a NAFION film (N) and one with a NAFION film+magnetic modification (M) in an electrolyte of $TBABF_4$ in acetonitrile, the following protocol at the two working electrodes where one electrode is used at a time allows separation of all.

| Solution Composition | Separated | Wave/electrode | ΔE | Protocol |
|---|---|---|---|---|
| Dy(III) + Gd(III) + Pr(III) + Sm(III) + Yb(III) | | | | Initial Composition |
| Dy(III) + Gd(III) + Pr(III) + Sm(III) + Yb(III) | Dy(II) | A/M | 60 | 1)→Dy(II), remove Dy(II) |
|  | Gd(III) | A/N | 30 | 2) →Pr(II), Yb(II), Sm(II), |
| Gd(III) + Pr(II) + Sm(II) + Yb(II) | | | | remove Gd(III) |
|  | Pr(II) | B/N | 300 | 3)→Sm(I/0), Yb(I/0), |
| Pr(II) + Sm(I/0) + Yb(I/0) | | | | remove Pr(II) |
|  | Sm(I/0) | B/M | 30 | a- →Yb(II), |
| Sm(I/0) + Yb(II) | | | | remove Sm(I/0) |
| Yb(II) | Yb(II) | | | b- All separated, only Yb(II) remains |

The use of NAFION films with and without magnetic modification allows separation of all five lanthanides.

These examples are not intended to be limiting or exclusive. They are possible protocols based on the data in Table 1. Other protocols may be more effective, depending on the metals present, concentrations and potential shifts available based on ligands, solvent, and magnetic modification.

The separation may be enabled by shifts in the formal potentials or by kinetic limitations of the electron transfer and chemical steps or both. Stronger magnets will allow different potential shifts and thereby other separation protocols.

Larger shifts would further enable the separations. Consider the thermodynamic Nernstian model. For equal concentrations, a 30 mV difference in formal potentials will allow enrichment of one species over another of 5 to 1. A difference of 100 mV is 50 to 1; 200 mV is 2400 to 1. Under kinetic control, other enrichments may be accessible. Larger shifts may be accessible with, for example, stronger magnets, different ligands, different solvents, or some combination thereof.

Also, EDTA is a ligand used to separate lanthanides by complexation of the Ln(III) species. In *Biochemistry of the Lanthanides*, C. H. Evans, 1990, the formation constants across the lanthanide series vary as $pK_f = -15.5$ for La-EDTA and $pK_f = -19.93$ for Lu-EDTA. These are substantial formation constants with little variation across the 15 lanthanides. Because the formation constants are so large, in a mixture of lanthanides, there is little discrimination between one lanthanide and another. To achieve a 5 to 1 concentration ratio of one complexed lanthanide to another is very sensitive to concentration of the lanthanides and the EDTA and numerous extractions will be necessary. Formation constants are strongly dependent on charge, so that coupling voltammetry with well-chosen ligands may provide efficient separations.

Examples Part III: Oxygen Reduction Reaction Experiments

Methods and Materials

Platinum electrodes were modified with NAFION films and magnetized composites of chemically inert, magnetic microparticles suspended in a NAFION film as above. ORR was electrochemically evaluated in a $TBABF_4$ only acetonitrile system and a ytterbium triflate plus $TBABF_4$ in acetonitrile system. Analysis was done by cyclic voltammetry in a three electrode setup. The film preparation, magnetization, and electrochemical analysis are as described above except as noted.

Electrode and Solution Preparation

Solutions of 0.10 M tetrabutylammonium tetra fluoroborate ($TBABF_4$) electrolyte only and solutions of 1.00 mM ytterbium trifluoromethanesulfonate (YbOTf) and 0.10 M $TBABF_4$ were prepared in acetonitrile (dried with molecular sieve).

Electrochemical Measurements

When ORR was investigated, solutions were saturated with oxygen. $O_2$ (g) was bubbled into the solution between scans and an oxygen blanket was maintained during each scan. The concentration of saturated $O_2$ (g) in acetonitrile was calculated to be 8 mM based on the value for $O_2$ (g) concentration in acetonitrile in air and experimentally measured currents for a solution equilibrated in air and one saturated with $O_2$ (g). This saturated $O_2$ (g) concentration agreed with a literature value. Triplicate measurements were completed for each solution at each scan rate.

Cyclic voltammetry was performed where the potential was swept from +1.5 V to −2.0 V to +2.0 V vs. Ag/AgO QRE at 200 mV/s. Platinum disk (0.452 cm$^2$) was used as the electrode substrate.

$E_{p/2}$ is a crude experimental estimate of the formal potential $E^{0'}$ calculated as halfway between $E_f$ and $E_r$. Peak height ratios of $i_{pf}$ and $i_{pr}$ are an indication of chemical reversibility where $i_{pf}/i_{pr}=1$ is anticipated for complete chemical reversibility. Peak splitting $\Delta E_p$ is an indication of electron transfer reversibility where 58 mV/n is defined as reversible. For $\Delta E_p$ larger than 58 mV/n, the electron transfer is quasireversible or irreversible, chemical steps excluded. When modification decreases $\Delta E_p$ for an electrode reaction that is not reversible without modification, the rate of reaction has increased and system has been made more efficient (reversible). The sharper the current increase with applied potential (i.e., the rise), the faster the electron transfer reaction rate. The cyclic voltammetric plot of current i versus potential V can be viewed in terms of Ohm's law where i=V/R. A steeper rise of i with respect to V represents lower resistance to the electrochemical reaction.

Figure 8:
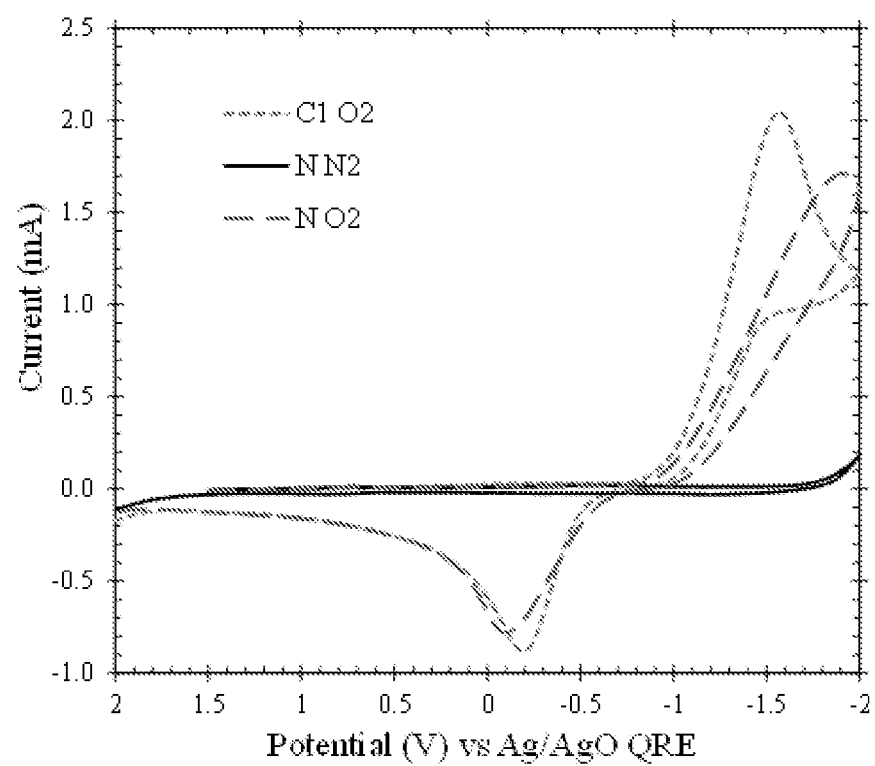

FIG. 8 is an overlay of 200 mV/s cyclic voltammograms for a nitrogen sparged solution of 0.10 M $TBABF_4$ and oxygen saturated solutions of 0.10 M $TBABF_4$ at electrodes modified with a NAFION film and a magnetized NAFION+SiMag-C1 composite. There was no ORR signal when the solution was $N_2$ (g) sparged. The forward current increases by 19.4%, the peak splitting decreases by 436±35 mV, and the $E_{p/2}$ shifts positive by 130±9 mV when magnets were present as compared to the simple NAFION film. The potential at half maximum forward current (E at $i_{pf}/2$) shifts by 90±20 mV for the composite compared to the film. This corresponds to a decrease in the kinetic tax (overpotential) for the ORR.

Figure 9:
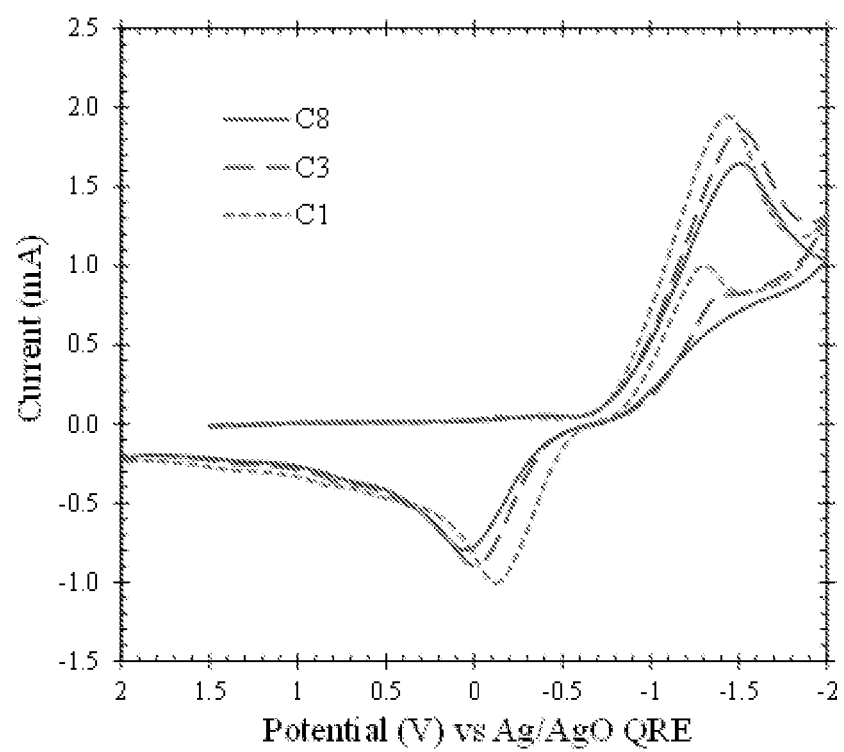

FIG. 9 is an overlay of cyclic voltammograms at electrodes modified with composites of three different SiMag-Cx particles. Behaviors were consistent with faster rates for higher magnetic susceptibility and the data in FIG. 8. There is a linear correlation between the magnetic susceptibilities of the maghemite particles and the forward peak currents. There is also a corresponding linear correlation between the magnetic susceptibilities of the particles and peak splittings.

Figure 10:
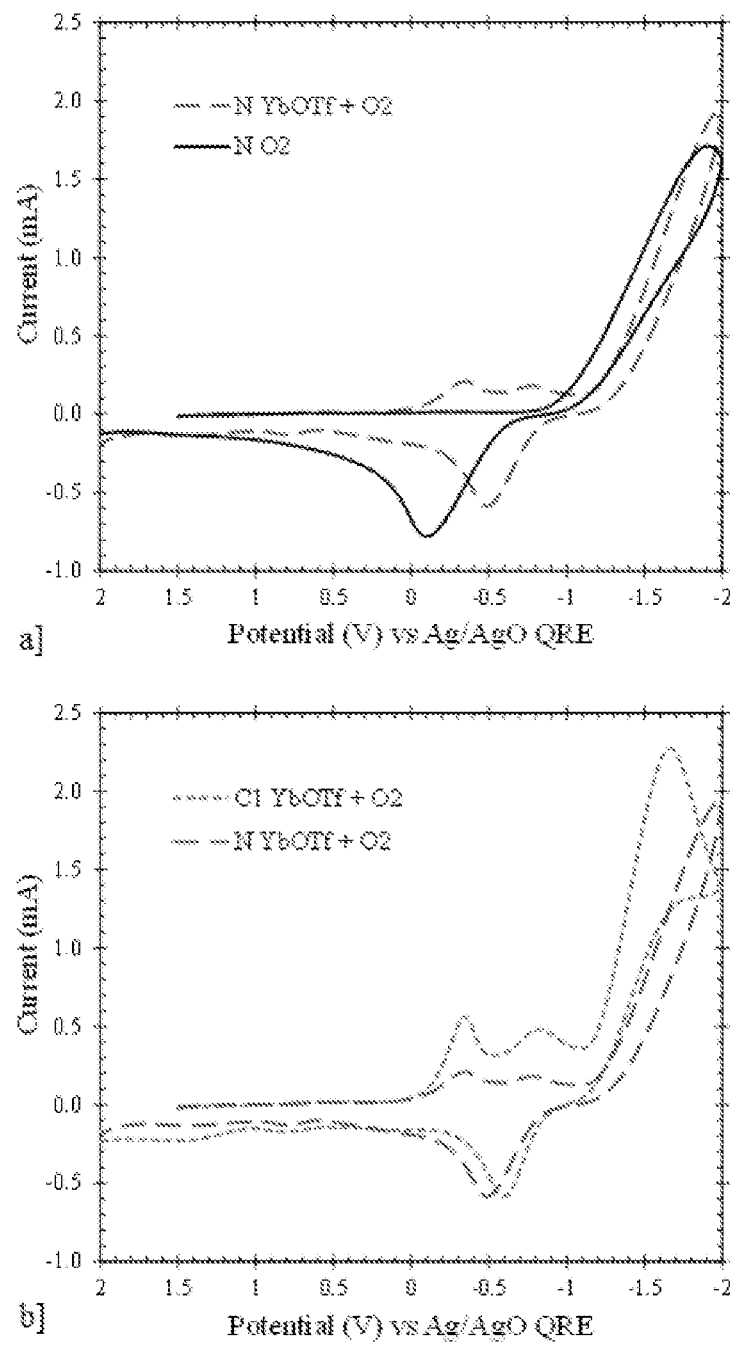

FIG. 10a is an overlay of 200 mV/s cyclic voltammograms for oxygen saturated solutions of 0.10 M $TBABF_4$ and 1.0 mM ytterbium triflate plus 0.10 M $TBABF_4$ at electrodes modified with a NAFION film. The forward current increases by 13±5%, the peak splitting decreases by 306±28 mV, and the $E_{p/2}$ shifts negative by 240±20 mV when YbOTf was present. The potential at $i_{pf}/2$ shifts by −170±20 mV for the composite compared to the film. The rising portion of the voltammogram (near—1 V) when YbOTf was present was steeper than for only the NAFION film consistent with less reaction resistance with the lanthanide triflate present. YbOTf is known to be a catalyst for the homogeneous Diels Alder reaction, but not for an electrode reaction, the ORR.

FIG. 10b is an overlay of 200 mV/s cyclic voltammograms for oxygen saturated solutions of 1.0 mM YbOTf+ 0.10 M $TBABF_4$ at electrodes modified with a NAFION film and a magnetized NAFION+SiMag-C1 composite. The current increases by 33±7%, the peak splitting decreases by 750±70, and the $E_{p/2}$ shifts negative by 100±6 mV when magnets were present. The potential at $i_{p/2}$ shifts by 40±20 mV for the composite compared to the NAFION. Even though $E_{p/2}$ shifts negative, the positive shift in E at $i_{p/2}$ indicates a decrease in the kinetic tax (overpotential) for the ORR. The rising portion of the voltammogram when YbOTf and micromagnets are present in a NAFION film (near—1V) was steeper than for only YbOTf in a NAFION film, consistent with less reaction resistance when both the lanthanide triflate and magnetic microparticles were present.

Evidence of enhanced electron transfer kinetics is observed. When magnets were present in the $O_2$ (g) saturated electrolyte only solution, currents increase by almost 20%, the peak splitting was reduced by more than 400 mV, and the overpotential was reduced ($E_{p/2}$ and E at $i_{pf}/2$ shift positive) by about 100 mV, indicating the reaction was more efficient (reversible) when catalyzed by magnetic fields. When ytterbium triflate was present, currents were increased by a net 33% change and peak splitting was reduced by a net 750 mV change. $E_{p/2}$ shifts negative by a net 100 mV, but the overpotential E at $i_{pf}/2$ decreases by a net 40 mV change. The largest increases in ORR rate were found when NAFION, lanthanide triflate, and magnetic microparticles were present.

Additional data for Part III are provided in Table 2 below:

TABLE 2

Potentials and Peak Currents for ORR at Non-Magnetic NAFION Films and Three Magnetic Microparticle Composites on Pt Electrodes with and without Yb Triflate in Acetonitrile with 0.1M $TBABF_4$ Saturated with $O_2$ (about 8 mM). N is for NAFION films and C1 is for NAFION magnetic particle composites.

| Film | Solution | $E_{pf}$ (V) | $E_{pr}$ (V) | $i_{pf}$ (mA) | $i_{pr}$ (mA) | $E_{p/2}$ (V) | $\Delta E_p$ (V) | $E_{ipf/2}$ (V) |
|---|---|---|---|---|---|---|---|---|
| N | $O_2$ | −1.91 ± 0.02 | −0.10 ± 0.02 | 1.70 ± 0.02 | −0.79 ± 0.01 | −1.01 ± 0.01 | 1.81 ± 0.04 | −1.40 ± 0.01 |
| C1 | $O_2$ | −1.57 ± 0.05 | −0.20 ± 0.05 | 2.28 ± 0.03 | −0.89 ± 0.02 | −0.88 ± 0.02 | 1.37 ± 0.10 | −1.31 ± 0.01 |

TABLE 2-continued

Potentials and Peak Currents for ORR at Non-Magnetic NAFION Films and Three Magnetic Microparticle Composites on Pt Electrodes with and without Yb Triflate in Acetonitrile with 0.1M TBABF$_4$ Saturated with O$_2$ (about 8 mM). N is for NAFION films and C1 is for NAFION magnetic particle composites.

| Film | Solution | $E_{pf}$ (V) | $E_{pr}$ (V) | $i_{pf}$ (mA) | $i_{pr}$ (mA) | $E_{p/2}$ (V) | $\Delta E_p$ (V) | $E_{ipf/2}$ (V) |
|---|---|---|---|---|---|---|---|---|
| C3 | O$_2$ | −1.81 ± 0.03 | −0.11 ± 0.04 | 1.86 ± 0.01 | −0.89 ± 0.01 | −0.90 ± 0.03 | 1.50 ± 0.07 | −1.33 ± 0.02 |
| C8 | O$_2$ | −1.69 ± 0.02 | −0.12 ± 0.02 | 1.72 ± 0.02 | −0.76 ± 0.02 | −0.90 ± 0.03 | 1.60 ± 0.04 | −1.35 ± 0.02 |
| N | YbOTf + O$_2$ | −2.00 ± 0.01 | −0.49 ± 0.02 | 1.95 ± 0.02 | −0.60 ± 0.01 | −1.25 ± 0.01 | 1.50 ± 0.03 | −1.57 ± 0.01 |
| C1 | YbOTf + O$_2$ | −1.67 ± 0.02 | −0.61 ± 0.03 | 2.28 ± 0.02 | −0.60 ± 0.02 | −1.14 ± 0.03 | 1.06 ± 0.05 | −1.36 ± 0.01 |

Result of the ORR experiments are tabulated in Table 2, where N is a NAFION film, C1, C3, and C8 are different magnetic particles where the strength of the magnetic properties is ordered as C1>C3>C8. The solution either contains oxygen or oxygen+YbOTf.

In summary, efficiency of ORR increases with magnetic properties as shown by at least $E_{pf}$, $i_{pf}$, $E_{p/2}$, and $\Delta Ep$, whether YbOTf is present or not. With no magnetic modification, ORR is more efficient with YbOTF present than absent based on the strong indicators of $i_{pf}$ and $\Delta Ep$. For the strongest magnetic material C1, the performance is similar with and without YbOTf based on $E_{pf}$, $i_{pf}$, and $\Delta Ep$.

These preliminary results have significant implications for nonaqueous metal air batteries, as

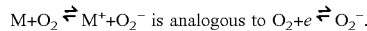

$M+O_2 \rightleftarrows M^+ + O_2^-$ is analogous to $O_2 + e \rightleftarrows O_2^-$.

Improved performance is anticipated either when cathodes are formed by adding magnets or by adding YbOTf (or other lanthanide) or both to the battery. Here, a novel means to catalyze the ORR in a nonaqueous solvent is reported.

Comparative Examples

In a first comparative example, cyclic voltammetry was attempted based on the Parrish 2001 *Tetrahedron Letters* paper cited above and it was found that the previously reported voltammetry was for oxygen reduction, not for lanthanide voltammetry. The system included boron doped diamond (BDD) electrode (0.4 cm$^2$) in acetonitrile that contains 1.0 mM ytterbium(III) trifluoromethanesulfonate (Yb(OTtf)$_3$) and 50 mM tetrabutylammonium bromide (TBABr) with a silver quasireference electrode, Pt mesh counter electrode, and the solution sparged with nitrogen. No cyclic voltammetric response was observed for Yb(OTtf)$_3$. When sparged with oxygen, however, voltammetric responses for oxygen were found. Hence, the ytterbium triflate did not yield a voltammetric response in acetonitrile absent the NAFION as was found, in contrast, in the working examples.

In a second comparative example, an experiment was undertaken as 1.0 mM cerium (III) nitrate and 0.10 M NaClO$_4$ in water with a Pt mesh counter and SCE reference, both nitrogen sparged and under ambient conditions at a BDD electrode (0.4 cm$^2$). Ill-defined voltammetric responses were ascribed to nitrate reduction. No cerium electrolysis was observed absent triflate, absent NAFION, and absent acetonitrile as was found, in contrast, in the working examples.

In a third comparative example, an experiment was undertaken as 1.0 mM ytterbium (III) triflate and 0.10 M NaClO$_4$ in water with a Pt mesh counter and SCE reference, both nitrogen sparged and oxygen sparged at a BDD electrode (0.4 cm$^2$). Blanks absent the ytterbium triflate were also recorded. The cyclic voltammetric response was the same whether the ytterbium triflate was present or not. No ytterbium triflate voltammetry was observed absent acetonitrile and absent NAFION as was found, in contrast, in the working examples.

In a fourth comparative example, an experiment was undertaken with three concentrations 0.5, 1.0, and 2.0 mM cerium (III) nitrate and 0.10 M TBABF$_4$ in acetonitrile with a Pt mesh counter and SCE reference, both nitrogen sparged and under ambient conditions at a BDD electrode (0.4 cm$^2$). Ill-defined voltammetric responses near 0 V vs Ag QRE were ascribed to nitrate reduction. No cerium electrolysis was observed absent triflate and absent NAFION as was found, in contrast, in the working examples.

In a fifth comparative example, 1 mM cerium nitrate in acetonitrile with 0.1 M TBABF$_4$ was examined with cyclic voltammetrically at a Nafion modified electrode. No cyclic voltammetric waves characteristic of lanthanides were observed. Thus, absent the triflate lanthanide, voltammetry was not observed, in contrast to what was found in the working examples.

What is claimed is:

1. A method comprising:
   electrochemically oxidizing and/or reducing at least one lanthanide, at least one actinide, or a combination thereof, irrespective of oxidation state, in a solvent system at at least one working electrode,
   wherein the solvent system comprises one or more organic solvents which have a dielectric constant of at least three and the water of the solvent system is less than about 25 wt. %;
   wherein the solvent system further comprises at least one electrolyte;
   wherein the at least one working electrode comprises at least one electronically conductive electrode substrate and at least one ionically conducting or ionically permeable film disposed on the substrate;
   wherein at least one ligand distinct from the ionically conducting or ionically permeable film is present as part of the lanthanide, the actinide, the electrolyte, or a combination thereof, wherein the ligand facilitates the oxidizing and/or reducing of the lanthanide, actinide, or combination thereof; and
   wherein the ligand is chemically similar to a structure in the ionically conducting or ionically permeable film, wherein the electrochemical oxidation and/or reduction is not carried out under the influence of a magnetic field which favorably enhances the reaction.

2. The method of claim 1, wherein the step of electrochemically oxidizing and/or reducing is carried out on a lanthanide but not an actinide.

3. The method of claim 1, wherein the step of electrochemically oxidizing and/or reducing is carried out on a mixture of lanthanide and actinide.

4. The method of claim 1, wherein the step of electrochemically oxidizing and/or reducing is carried out on a mixture of at least two different lanthanides.

5. The method of claim 1, wherein the lanthanide, irrespective of oxidation state, is Ln, Pr, Nd, Pm, Sm, Gd, Tb, Dy, Ho, Er, Tm, Yb, or Lu.

6. The method of claim 1, wherein the lanthanide, irrespective of oxidation state, is Pr, Sm, Gd, Dy, or Yb.

7. The method of claim 1, wherein the solvent has a dielectric constant of at least 5.

8. The method of claim 1, wherein the organic solvent is acetonitrile or methylene chloride.

9. The method of claim 1, wherein the ligand is a fluorosulfonate anion.

10. The method of claim 1, wherein the ligand is trifluoromethane sulfonate (triflate).

11. The method of claim 1, wherein the film comprises at least one polymer.

12. The method of claim 1, wherein the film comprises at least one ionically conductive polymer.

13. The method of claim 1, wherein the film comprises at least one fluorosulfonate polymer.

14. The method of claim 1, wherein the film comprises at least one fluorosulfonate polymer, and the ligand is a fluorosulfonate anion.

15. The method of claim 1, wherein the film is not magnetically modified.

* * * * *